United States Patent
Matsuda et al.

[11] Patent Number: 5,814,932
[45] Date of Patent: Sep. 29, 1998

[54] PHOSPHOR, CATHODE-RAY TUBE, FLUORESCENT LAMP AND RADIATION INTENSIFYING SCREEN

[75] Inventors: Naotoshi Matsuda, Tokyo; Masaaki Tamatani, Fujisawa; Keiko Albessard, Yokohama; Miwa Okumura, Kawasaki; Takeshi Takahara, Yokohama; Takeo Itou, Kumagaya, all of Japan

[73] Assignee: Kabushiki Kaisha Toshiba, Kawasaki, Japan

[21] Appl. No.: 774,421

[22] Filed: Dec. 30, 1996

Related U.S. Application Data

[62] Division of Ser. No. 356,959, Dec. 16, 1994.

[30] Foreign Application Priority Data

| Dec. 17, 1993 | [JP] | Japan | 5-343241 |
| Sep. 19, 1994 | [JP] | Japan | 6-223582 |
| Sep. 19, 1994 | [JP] | Japan | 6-223583 |
| Oct. 7, 1994 | [JP] | Japan | 6-270221 |

[51] Int. Cl.⁶ .................................................. H01J 29/10
[52] U.S. Cl. ................... 313/461; 313/461; 313/467; 313/469
[58] Field of Search ............... 313/461, 467–69, 313/483–87, 635, 525; 252/301.4 R, 301.5; 427/212; 428/402, 403

[56] References Cited

U.S. PATENT DOCUMENTS

| 2,049,765 | 8/1936 | Fischer | 252/301.4 R |
| 2,284,055 | 5/1942 | Huniger et al. | 252/301.4 R |
| 2,617,773 | 11/1952 | Nagy et al. | 252/301.5 |
| 2,807,586 | 9/1957 | Moran | 252/301.5 |
| 2,980,550 | 4/1961 | Seats | 428/428 |
| 3,032,428 | 5/1962 | Ginther | 436/58 |
| 3,097,172 | 7/1963 | Ginther | 252/301.4 R |
| 3,338,841 | 8/1967 | Brixner | 252/301.4 R |
| 3,368,980 | 2/1968 | Avella et al. | 252/301.4 R |
| 3,437,432 | 4/1969 | Borchardt | 423/263 |
| 3,440,080 | 4/1969 | Tamura et al. | 360/90 |
| 3,449,258 | 6/1969 | Ropp et al. | 252/301.4 R |
| 4,752,428 | 6/1988 | Matsuda et al. | 264/1.22 |
| 4,863,882 | 9/1989 | Matsuda et al. | 501/94 |
| 5,340,673 | 8/1994 | Tateyama et al. | 430/23 |
| 5,442,254 | 8/1995 | Jaskie | 313/485 |

FOREIGN PATENT DOCUMENTS

| 52-37581 | 3/1977 | Japan . |
| 62-201989 | 9/1987 | Japan . |
| 1-108294 | 4/1989 | Japan . |

*Primary Examiner*—Sandra L. O'Shea
*Assistant Examiner*—Macli Haynes
*Attorney, Agent, or Firm*—Finnegan, Henderson, Farabow, Garrett & Dunner, L.L.P.

[57] ABSTRACT

Disclosed is a phosphor suitable for use in a cathode-ray tube, a fluorescent lamp, a radiation intensifying screen, which comprises transparent spherical particles having an average particle size of 0.5 to 20 μm and a ratio of the major diameter to the minor diameter of individual particles in the range of 1.0 to 1.5, and ultrafine particles having a diameter of 0.2 μm less in an amount of 5 wt % or less.

2 Claims, 5 Drawing Sheets

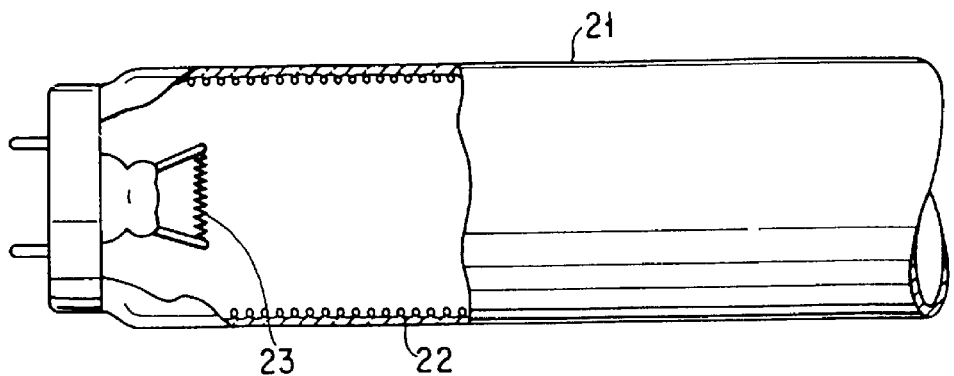
F I G. 3
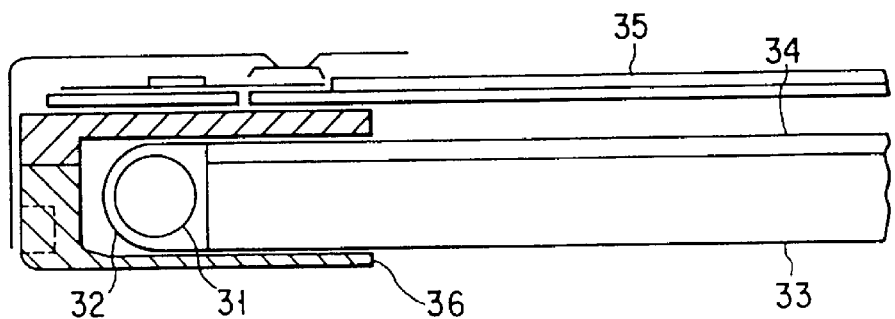
F I G. 4
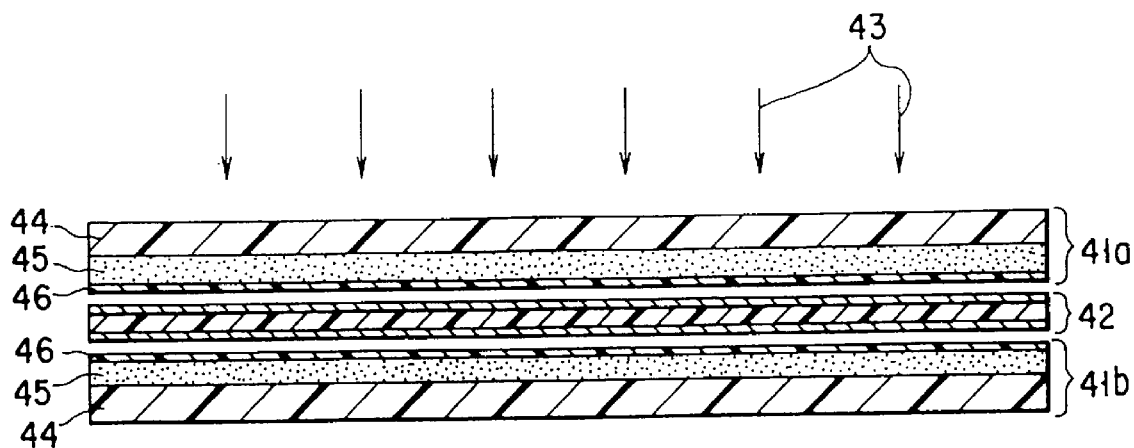
F I G. 5

PHOSPHOR, CATHODE-RAY TUBE, FLUORESCENT LAMP AND RADIATION INTENSIFYING SCREEN

This application is a division of application Ser. No. 08/356,959, filed Dec. 16, 1994.

BACKGROUND OF THE INVENTION

1. Field of the Invention

The present invention relates to a spherical phosphor, and a cathode-ray tube, a fluorescent lamp and a radiation intensifying screen using the same.

2. Description of the Related Art

Phosphors for use in cathode-ray tubes, fluorescent lamps, or radiation intensifying screens must have a particle size of several μm to obtain sufficient luminous efficiency when a phosphor is excited by electron beams, ultraviolet radiation or radioactive rays. In order to obtain crystalline particles of several μm in size, phosphor particles are generally synthesized by a solid-phase reaction using a flux. However, the phosphor particles synthesized by the method using the flux are not a completely spherical but near polyhedral shape reflecting crystalline structures of raw materials and/or the resulting phosphors.

When a phosphor screen of a cathode-ray tube, for example, is formed using the polyhedral phosphor, it accompanies the drawback that emission generated by electron beam excitation is not fully utilized as light output from the phosphor screen. More specifically, if the shape of the phosphor particles is near polyhedral, a dense phosphor layer free from void cannot be obtained. In addition, an aluminum backing serving as a reflecting film formed onto the phosphor layer is inferior in smoothness, exhibiting a rough surface. Consequently, the scattering of the emitted light increases causing a loss of light output. In a similar way, if the above phosphor is employed in a fluorescent lamp, emission by the ultraviolet excitation cannot be efficiently utilized since a dense phosphor layer is not obtained.

A color cathode-ray tube is manufactured by, for example, the following method. First, the inner surface of glass is coated with a slurry containing a phosphor and a photosensitive resin, thereby forming a phosphor layer. Subsequently, a desired portion alone is hardened by exposure with ultraviolet radiation. Thereafter, a non-exposed portion of the phosphor layer is washed away. If light scattering of the phosphor layer is large, the ultraviolet ray cannot penetrate deep into the inside portion. As a result, the inside portion is hardly hardened and thus it is hard to form a phosphor layer thick enough to exhibit maximum brightness. If light is scattered excessively, it will be also difficult to make a phosphor layer pattern into a predetermined shape since the portion other than the desired portion is hardened by exposure.

In a cathode-ray tube for use in a projection television, a phosphor layer is generally formed by the following steps. First, phosphor particles are suspended in an aqueous barium acetate solution placed in a glass bulb for cathode-ray tube. To the suspension solution, an aqueous solution of potassium silicate is added and the phosphor particles are allowed to settle onto the inner surface of the glass bulb. Three cathode-ray tubes emitting red, green and blue, respectively, are produced in such steps. Images are magnified by means of three optical lenses individually set in front of the three cathode-ray tubes emitting three colors, and then projected onto a screen. To provide sufficient brightness levels in the screen, a high-power electron gun is used. Even a small defect present on the phosphor layer is magnified clearly on the screen. The dense phosphor screen, therefore, is strongly demanded with the recent tendency toward a high quality image. Furthermore, even under a high load of electron input, it is necessary to minimize a decrease of light output and deterioration.

In most X-ray image intensifiers for use in medical diagnosis and in material examination, an image in the output screen is usually picked up with a TV camera and amplified for observation. To meet such usages, a uniform, dense, and high resolution phosphor screen is required.

The larger the total surface area of phosphor particles contained in the phosphor layer, the more prominent the light scattering. It is therefore desirable that phosphor particles be as spherical as possible. To form spherical phosphor particles, an emulsion method may be employed which is disclosed in B. C. Grabmaier, W. Rossner, J. Leppert; Phys. Stat. Sol. (a) 130, K183 (1992). However, the phosphor obtained by this method is a cluster of fine particles having poor crystalline characteristics, so that the phosphor has to be subjected to refiring. However, the resultant phosphor particles do not always have a completely spherical shape. In addition, their sizes are small. Hence, they are not suitable for use in a cathode-ray tube and a fluorescent lamp.

As another method of forming a spherical phosphor particles is disclosed in Jpn. Pat. Appln. KOKAI Publication No. 62-201989. In this method, a starting phosphor consisting of granulated secondary particles is heated in high-temperature plasma. However, the phosphor formed by this method has drawbacks below: It is difficult to obtain a phosphor having a preferable size by this method. In addition, obtained phosphor has disadvantageous dispersion and adhesion properties. Further, obtained phosphor cannot have a desirable activator concentration suitable for practical phosphor in view of emission color and luminous efficiency.

In a color display, phosphors emitting three colors, red, green, blue are used. A deep red-emitting, bright phosphor is desired for the reason of broadening a color reproduction range as much as possible. A representative red-emitting phosphor for use in a cathode-ray tube, which almost satisfies the above condition is $Y_2O_2S$:Eu. However, the particles of $Y_2O_2S$:Eu are polyhedral, so that $Y_2O_2S$:Eu is not free from a drawback attributed to the light scattering explained above. Hence, it is strongly demanded that the deep red-emitting phosphor having a spherical shape be developed.

A fluorescent lamp for lightning requires not only a sufficient level of brightness, namely luminous efficiency, but the level of making an object color look natural under illumination with a lamp, namely color rendering properties, so that a three-component type fluorescent lamp improved in both luminous efficiency and color rendering properties may be widely used. The three-component type fluorescent lamp can be obtained by mixing the following three phosphors in appropriate amounts and coating the phosphor mixture onto the inner surface of a glass tube:

a blue-emitting phosphor having an emission peak near 450 nm such as a divalent europium-activated barium magnesium aluminate phosphor or a divalent europium-activated barium calcium strontium halophosphate phosphor;

a green-emitting phosphor having an emission peak near 545 nm such as a cerium terbium-activated lanthanum phosphate phosphor or a cerium terbium-activated magnesium aluminate phosphor; and a red-emitting phosphor having an emission peak near 611 nm such as an europium-activated yttrium oxide phosphor ($Y_2O_3$:Eu).

An average color rendering index, $R_a$ of the fluorescent lamp thus-obtained is as high as 84 to 88. The three-component type fluorescent lamp having this value is excellent in appearing the color of an irradiated object more natural and beautiful. However, the three-component type fluorescent lamp is disadvantageous in that the specific color rendering index $R_9$ for a red color with high chroma is as low as 20 to 40.

To overcome this problem, the present applicants disclosed a technique in Jpn. Appln. KOKAI Publication No. 5-244878. This technique is that a deep red-emitting europium-activated monoclinic gadolinium oxide ($Gd_2O_3$:Eu) phosphor having an emission peak near 623 nm is blended with the aforementioned three phosphors. By adding the monoclinic $Gd_2O_3$:Eu phosphor to the three phosphors in an amount of 12 wt %, $R_9$ is successfully improved by 18 points. On the other hand, total luminous flux, however, decreased by 2.4%. To increase $R_9$ by 10 points, the total luminous flux is inevitably decreased by approximately 1.3%.

$Gd_2O_3$:Eu may belong to a monoclinic crystalline system, as shown in R. C. Ropp: J. Electrochem. Soc., Vol. 112, p. 181 (1965). $Gd_2O_3$:Eu is stable in a cubic system at room temperature, as shown in R. S. Roth et al.: J. Res. National Bureau of Standards, Vol. 64A, p. 309 (1960). In order to obtain a monoclinic system stable at high temperatures, it is necessary to heat $Gd_2O_3$ to high temperature of 1200° C. or more, followed by quenching. Therefore, it is difficult to prepare the monoclinic system by a usual method of firing in a crucible.

On the other hand, as shown in Arai et al.:J. Alloys and Compounds, Vol. 192, p. 45 (1993), since a praseodymium-activated monoclinic $Gd_2O_3$ has a green emission band which cannot be obtained in the cubic $Gd_2O_3$, it may be applied to the usage requiring short persistent green emission. In this case too, it is necessary to overcome the problems in connection with preparing a stable monoclinic system in high temperatures.

In recent years, a fluorescent lamp has been frequently used as a back light for a liquid crystal display. In this case, the fluorescent lamp is used in combination with a reflecting film and a light guide plate and a scattering plate. For saving energy, the luminous efficiency is desired to be as high as possible, when the fluorescent lamp is used in combination with the reflecting film. In a conventional fluorescent lamp, due to low transmittance of a phosphor layer, problematic loss of light occurs during a process in which part of emission light is returned into the fluorescent lamp by a reflecting film, transmits through the lamp and converges in one direction. The tube diameter of the back light for a liquid crystal display is usually set to a significantly small value as compared to that (25 to 35 mm) of a lamp for general lighting, taking brightness and compactness into consideration. In such a fluorescent lamp, phosphor is coated by means of the syringe injection method or the sucking method under reduced pressure, not by the slurry flow method employed for a conventional lamp. In this case, if phosphor particles are aggregated in the slurry and a slurry has poor fluidity, an injection nozzle may be clogged with the aggregated phosphor particles, and a phosphor layer to be formed may have a rough screen.

In the case of a radiation intensifying screen, in order to prevent a decrease in the sensitivity, it may be effective to increase radiation absorption and luminous efficiency by thickening the phosphor layer. However, the thick phosphor layer increases light scattering, with the result that the sufficient sensitivity cannot be obtained. On the other hand, when an average particle size of the phosphor particles used in the phosphor layer is increased, the light scattering can be suppressed but, instead, sharpness of the obtained radiation image is lowered. To obtain an intensifying screen having high sensitivity and creating a sharp radiation image, a method of forming a double-layered phosphor layer by coating phosphor particles having different average particle sizes is used (Jpn. Pat. Appln. KOKAI Publication No. 1-57758). In this method, first, particles are prepared by a wet precipitation and firing method. The obtained particles are classified into two types of phosphor particles having different average particle sizes (e.g., $CaWO_4$ of 4.2 μm and 9.6 μm in average particle size) by means of a the sedimentation method. To a mixture containing two types of phosphor particles thus-obtained, a binder is added, thereby making a slurry. Thereafter, the slurry is coated on a protection film by means of a knife coater and successively a slurry containing phosphor particles of a smaller average particle size (e.g., $CaWO_4$ of 4.2 μm in average particle size) alone is coated on the above phosphor layer in the same manner as above. Onto the resultant phosphor layer, a screen base is adhered, thereby forming the intensifying screen. However, this manufacturing process requires too many steps and has a drawback in that it is difficult to set sizes and contents of the phosphor particles since the phosphor particles having different average particle sizes are used. Due to the aforementioned drawbacks, it is difficult to obtain a desired radiation intensifying screen.

SUMMARY OF THE INVENTION

The present invention made with the view to solve the above-mentioned problems. An object of the present invention is to provide a phosphor of a near spherical shape having small particle size. An another object of the present invention is to obtain a cathode-ray tube and a fluorescent lamp excellent in brightness, and a radiation intensifying screen having high sensitivity and sharpness by forming a dense and uniform phosphor layer.

The phosphor of the present invention comprises transparent spherical particles having an average particle size of 0.5 to 20 μm and the ratio of the major diameter to the minor diameter of individual particles in the range of 1.0 to 1.5, and ultrafine particles having a size of 0.2 μm or less in an amount of 5 wt % or less.

In the present invention, phosphors satisfying the above conditions and exhibiting excellent characteristics include:

a rare earth oxide phosphor represented by the following formula:

$$Ln_2O_3:R$$

wherein Ln is at least one element selected from the group consisting of La, Gd, Lu and Y, and R is at least one element selected from the lanthanide group;

a rare earth oxysulfide phosphor represented by the following formula:

$$Ln_2O_2S:R$$

wherein Ln is at least one element selected from the group consisting of Y, La, Gd, and Lu, and R is at least one element selected from the lanthanide group; and a tungstate phosphor represented by the following formula:

$$MWO_4$$

wherein M is one element selected from the group consisting of Ca and Mg; or

The cathode-ray tube of the present invention comprises a glass tube, the inner surface of which a phosphor screen is formed, and an electron beam source, wherein at least a part of the phosphor constituting the phosphor screen comprises transparent spherical particles having an average particle size of 0.5 to 20 μm and the ratio of the major diameter to the minor diameter of individual particles in the range of 1.0 to 1.5, and ultrafine particles having a diameter of 0.2 μm or less in an amount of 5 wt % or less. More specifically, the cathode-ray tube may be used for a direct-view color cathode-ray tube having a shadow mask or a projection television. Further, the cathode-ray tube according to the present invention includes a radiation (e.g., X-ray) image intensifier.

The fluorescent lamp of the present invention comprises a glass tube, the inner surface of which a phosphor layer is formed, and electrodes for discharging, wherein at least a part of the phosphor constituting the phosphor layer comprises transparent spherical particles having an average particle size of 0.5 to 20 μm and the ratio of the major diameter to the minor diameter of individual particles in the range of 1.0 to 1.5, and ultrafine particles having a diameter of 0.2 μm or less in an amount of 5 wt % or less.

The radiation intensifying screen of the present invention comprises a phosphor layer and a protection layer on a screen base, wherein at least a part of the phosphor constituting the phosphor layer comprises transparent spherical particles having an average particle size of 0.5 to 20 μm and the ratio of the major diameter to the minor diameter of individual particles in the range of 1.0 to 1.5, and ultrafine particles having a diameter of 0.2 μm or less in an amount of 5 wt % or less.

BRIEF DESCRIPTION OF THE DRAWINGS

FIG. 3 is a view showing a structure of a fluorescent lamp according to the present invention;

FIG. 4 is a view showing a structure of a liquid crystal display apparatus having a light-guide type back light in which the fluorescent lamp according to the present invention is installed;

FIG. 5 is a view showing a structure of a radiation intensifying screen of the present invention;

DETAILED DESCRIPTION OF THE PREFERRED EMBODIMENTS

Figure 1:
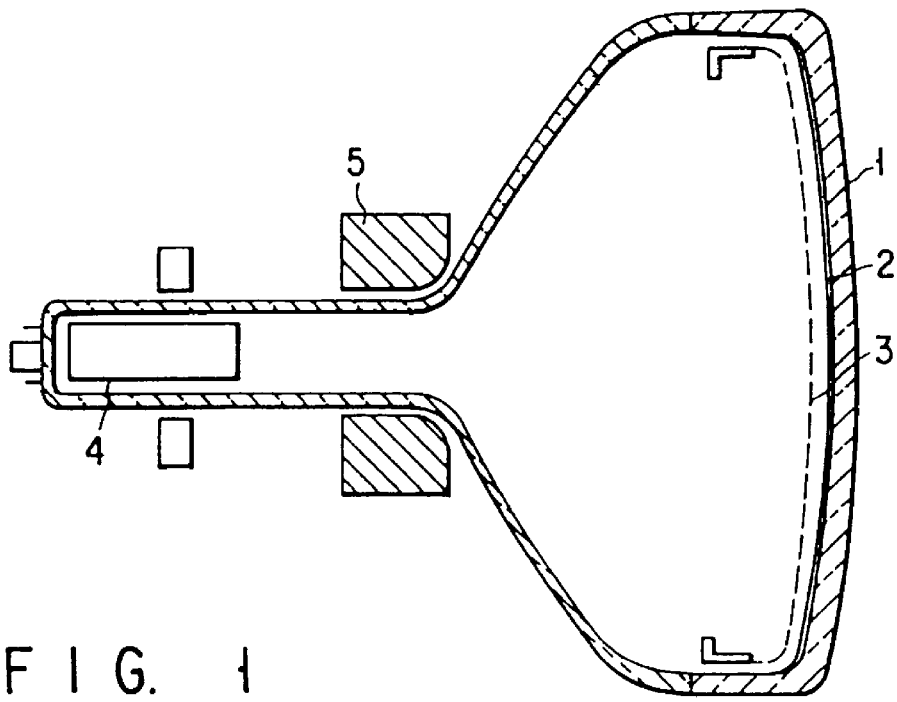
FIG. 1 is a view showing a structure of a color cathode-ray tube according to the present invention.

Hereinbelow, the present invention is described in detail.

The phosphor of the present invention comprises transparent spherical particles having an average particle size of 0.5 to 20 μm and having the ratio of the major diameter to the minor diameter of individual particles in the range of 1.0 to 1.5, and ultrafine particles of 0.2 μm or less in an amount of 5 wt %.

The average particle size of the transparent spherical particles contained as a main component is defined as 0.5 to 20 μm. If the average particle size is smaller than 0.5 μm or larger than 20 μm, the brightness of the phosphor screen formed will be lowered. The transparent spherical particles contained as the main component have the ratio of the major diameter to the minor diameter (an aspect ratio), i.e., the ratio of the longest diameter to the shortest diameter of individual particles preferably in the range of 1.0 to 1.5 and have a near spherical shape with no protruded edges. The ratio of the major diameter to the minor diameter of individual particles is more preferably in the range of 1.0 to 1.2. The ultrafine particles having a diameter of 0.2 μm or less contained in a ratio of 5 wt % or less based on that of the transparent spherical particles are mainly attached onto the surface of transparent spherical particles.

Unlike in the phosphor screen made of conventional phosphor, in the phosphor screen formed of the phosphor mainly comprising the spherical particles, since the total surface area of the spherical particles is small, the light scattering within the phosphor layer is decreased and the transmittance is improved even if the coating weight is equal to each other. If the transmittance of the phosphor screen is high, light proceeding in the opposite direction of an electron beam source (a side serving to human observation) of the entire emitted light on the phosphor screen will increase, either in a color cathode-ray tube or in a monochrome cathode-ray tube. In addition, since the phosphor particles in the phosphor screen are almost close-packed, a reflecting metal film formed on the phosphor screen becomes more smooth. Consequently, light proceeding in a direction of the electron beam source of the entire emitted light on the phosphor screen can be efficiently reflected. In other words, the light to be used as light output increases resulting in the improvement of the brightness. Further, in the case where the phosphor screen for use in a color cathode-ray tube is formed by a photoprinting method, since the phosphor screen is irradiated to the deep inside thereof by virtue of high level of light transmittance, a phosphor screen can be formed thicker than that made of conventional phosphor and the thickness is easily controlled. In addition, since the phosphor layer has high level of light transmittance and density, an excellent phosphor pattern can be obtained free from irregularity at the pattern edges attributable to light scattering.

As described above, the content of the ultrafine particles present in the phosphor of the present invention is defined as 5 wt % or less. The reason of this is as follows: If the content of the ultrafine particles attached onto the surface of or mixed with the transparent spherical particles of several μm exceeds 5 wt %, the transmittance of the spherical particles and the formed phosphor layer decreases since the light scattering increases. Further, since the ultrafine particles have low luminous efficiency, if they are mixed with the transparent spherical particles of several μm, the luminous efficiency of the entire phosphor will decrease. In contrast, if the ultrafine particles are present in an amount of 5 wt % or less, the light transmittance and the luminous efficiency of the phosphor layer will not decrease. The ultrafine particles attached onto the spherical particles improve the fluidity and dispersion properties of the phosphor and adhesion ability of the phosphor layer to a substrate. If phosphor having good fluidity is blended with other phosphor, a uniform phosphor layer can be readily obtained. Hence, the phosphor containing ultrafine particles in an amount of 5% or less are useful particularly in a fluorescent lamp in which a phosphor mixture are usually used. If the dispersion is improved, the packing of the phosphor particles in the phosphor layer, which is formed by the settling method or the slurry method, is further improved. The improvement in adhesion ability is presumably brought by the function that the ultrafine particles act as a low-melting point binder in a baking step performed at 400° to 700° C., in manufacturing process for a fluorescent lamp and a cathode-ray tube. However, if the ultrafine particles are present in an amount of 0.001 wt % or less, the above advantages may disappear.

A suitable average particle size of the spherical particles and a suitable content of the ultrafine particles vary depending on the types of phosphors and the application thereof. Hence, hereinbelow, we will individually explain them in detail with reference to a rare earth oxide phosphor, a rare earth oxysulfide phosphor and a tungstate phosphor.

The rare earth oxide phosphor of the present invention is represented by the following formula:

$Ln_2O_3$:R wherein Ln is at least one element selected from the group consisting of La, Gd, Lu and Y, and R is at least one element selected from the lanthanide group. The rare earth oxide phosphor of the present invention comprises transparent spherical particles having an average particle size of 0.5 to 15 μm and having the ratio of the major diameter to the minor diameter of individual particles in the range of 1.0 to 1.5, and ultrafine particles having a diameter of 0.2 μm or less in an amount of 2 wt % or less. R denotes an element of the lanthanide group. Of the lanthanide group, particularly useful elements for a phosphor include: Ce, Pr, Nd, Sm, Eu, Tb, Dy, Ho, Er, Tm and Yb. Further it is desirable that R be Eu and the molar ratio of Eu to Ln be in the range of 1 to 6%, and R be Tb and the molar ratio of Tb to Ln be in the range of 0.1 to 6%; and R be Pr and the molar ratio of Pr to Ln be in the range of 0.01 to 0.5%. If the activator content does not satisfy the above range, such a phosphor cannot be put into practical use in a cathode-ray tube or a fluorescent lamp, in view of the emission color and luminous efficiency. The molar ratio range of Tb is broader than another activators. This is because the phosphor containing Tb in a low amount emits blue and the phosphor containing Tb in a high amount emits green. Both cases have practical usages to meet with their specific features.

A preferable rare earth oxide phosphor is represented by the following formula:

$Gd_2O_3$:R wherein R is at least one element selected from the lanthanide group, at least a part of the crystalline system thereof is a monoclinic system, and comprising transparent spherical particles having an average particle size of 0.5 to 15 μm and the ratio of the major diameter to the minor diameter of individual particles in the range of 1.0 to 1.5, and ultrafine particles having a diameter of 0.2 μm or less in an amount of 0.5 wt % or less.

A $Gd_2O_3$:R phosphor can be preferably used in a cathode-ray tube, however, the application of $Gd_2O_3$:R varies depending on the emission color, red or green which is determined by types of R. For example, in the case of a monoclinic system $Gd_2O_3$:Eu, the emission color is deep-red deeper than that emitted by a phosphor of a cubic system stable in low temperature. This red emission is suitably used as a red component in a color cathode-ray tube and a projection cathode-ray tube. In the case of monoclinic $Gd_2O_3$:Pr, the emission color changes to yellowish-green containing a green emission band from red emission of a cubic system stable at low temperatures. Since the monoclinic $Gd_2O_3$:Pr shows a very short afterglow as about 10 μs, it is suitably used as a green component in a specific cathode-ray tube required to be short persistent. Monoclinic $Gd_2O_3$:Tb shows green emission having high level of luminous efficiency, so that it is suitable as a green component for use in a projection CRT. A $Gd_2O_3$:R phosphor for use in such a cathode-ray tube is preferred to have an average particle size of 2 to 10 μm.

Of the aforementioned $Gd_2O_3$:R phosphors, a phosphor represented by the formula $Gd_2O_3$:Eu containing monoclinic crystallites in an amount of 5 to 100% and having a particle size of 0.5 to 3 μm is suitably used as a red component for use in a fluorescent lamp employing a phosphor mixture. In this case, it is preferable that the concentration of Eu be in the range of 1 to 6 mol %. If the concentration of Eu deviates from the above range, the luminous efficiency will be lowered. The average particle size is defined as 0.5 to 3 μm for the following reasons: It is empirically known that when a phosphor mixture is used in a fluorescent lamp, a red-emitting phosphor functions adversely to a total luminous flux from a view point of luminosity, and a total luminous flux increases as the phosphor particle size decreases. For this reason, an average particle size of the phosphor is preferred to be 3 μm or less. However, when the particle size of the phosphor is excessively small, the phosphor powder is hard to handle. The average particle size is, therefore, preferred to be 0.5 μm or more.

The rare earth oxysulfide phosphor of the present invention is represented by the following formula:

$Ln_2O_2S$:R wherein Ln is at least one element selected from the group consisting of Y, La, Gd, and Lu, and R is at least one element selected from the lanthanide group, and comprising transparent spherical particles having an average particle size of 0.5 to 15 μm and the ratio of the major diameter to the minor diameter of individual particles in the range of 1.0 to 1.5, and ultrafine particles having a size of 0.2 μm or less in an amount of 2 wt % or less. This phosphor can be used in a cathode-ray tube, an X-ray intensifying screen or a ceramics for scintillator. It is preferable that R be Eu and the molar ratio of Eu to Ln be 2 to 7%, and that R be Tb and the molar ratio of Tb to Ln be 0.1 to 6%, and that R be Pr and the molar ratio of Tb to Ln be 0.01 to 0.5%. If the activator content does not fall within the above range, such a phosphor cannot be put into practical use in the aforementioned application, in view of emission color and luminous efficiency. The molar ratio range of Tb is broader than another activators. This is because the phosphor containing a low amount of Tb emits blue light and the phosphor containing a high amount of Tb emits green light. Both cases are practical depending on applications. This phosphor is preferred, when a powder layer having an optically indefinite thickness is formed of the phosphor, to have reflectance for visible light of 85% or more. If the reflectance is less than 85%, the luminous efficiency will be lowered 10% or more. Such a phosphor is disadvantageous for practical use.

The tungstate phosphor of the present invention is represented by the following formula:

wherein M is one of the group consisting of Ca and Mg, or

and comprising transparent spherical particles having an average particle size of 0.5 to 20 μm and the ratio of the major diameter to the minor diameter of individual particles in the range of 1.0 to 1.5, and the ultrafine particles having a diameter of 0.2 μm or less in an amount of 0.001 to 5 wt %. In particular, it is preferable that the ultrafine particles of 0.2 μm or less be contained in the range of 0.01 to 2 wt %. This phosphor can be used in a cathode-ray tube and a fluorescent lamp. The tungstate phosphor having the above particle structure can be improve in a level of brightness in view of luminosity since the emission spectrum shifts to the longer wavelength side. Further, the deviation of the excitation peak wavelength from 254 nm becomes small, the excitation efficiency can be improved over a conventional level when the phosphor is excited by ultraviolet radiation of 254 nm. As a result, brightness of the phosphor screen is improved.

The phosphor of the present invention can be prepared by fusing starting phosphor particles and then quenching them. To be more specific, a method can be employed in which the starting phosphor particles are supplied to a high-temperature thermal plasma with a carrier gas and expelled out of the thermal plasma in short time. The thermal plasma used herein indicates a state in which gas is ionized in high temperatures. The thermal plasma can be generated by gas discharge using a high frequency electromagnetic wave of several to several tens of megahertz or direct current. By this, the gas temperature of the so-called torch or the frame portion reached several thousands to ten thousands degrees. The high frequency thermal plasma apparatus is detailed, for example, in Yoshida et al., Iron and Steel, Vol. 68, No. 10, p. 20 (1982).

Unlike in a preparing method disclosed in Jpn. Pat. Appln. KOKAI Publication No. 62-201989, in the present invention a starting phosphor is employed which has an activator concentration different from that of a desired phosphor, and it is not granulated, consisting of primary particles. Such a starting phosphor may be manufactured by firing with a flux or by thermally decomposing a co-precipitate of oxalates. Further, the difference in the average particle size between the starting phosphor and a final spherical phosphor can be lowered less than 50% by improving dispersion properties and fluidity thereof by treating the surface of the starting phosphor particles with acid or providing a small amount of organic surfactant to the surface. A primary particle size of the starting phosphor is preferably about 2 μm or more. This is because that if the primary particle size is smaller, final particles obtained by vaporization in the thermal plasma followed by quenching will have a size of 0.2 μm or less in most case. In contrast, if the primary particle size or the secondary particle size is excessively large, the final particle size will be too large to put into practical use. Hence, the size of the primary and secondary particles is desired to be 20 μm or less. Even if the primary particle size is 2 μm or more, since a part of the phosphor is vaporized in the plasma treatment and quenched, the final phosphor will contain ultrafine particles having a diameter of 0.2 μm or less. The amount of the ultrafine particles varies depending on power of the thermal plasma, a supply position of the starting phosphor, and a recovery method of the treated phosphor. In the present invention, when ultrafine particles are present excessively, they are removed by means of ultrasonic treatment performed in a liquid, e.g., water, thereby adjusting the amount of ultrafine particles to 5 wt % or less. After the thermal plasma treatment is completed, when the obtained phosphor is further fired at 800° to 1200° C., aggregated ultrafine particles grow again with increase in particle size and attach onto the surface of the spherical particles.

In the present invention, the crystal system may be made both a high-temperature phase and a low-temperature phase. For example, in the case of the $Gd_2O_3$ phosphor, even if the crystalline system of the starting material is a cubic system stable in low temperatures, the cubic system can be readily converted into the monoclinic system stable in high temperatures through a process in which starting particles are exposed, in thermal plasma, to temperatures higher than the transition temperature from the cubic system to the monoclinic system and then quenched. On the other hand, when the spherical phosphor containing ultrafine particles of the present invention is further refired at 800° to 1200° C., the spherical phosphor can be easily converted into a cubic system stable in low temperatures, while maintaining the spherical shape.

In the present invention, an activator concentration of the phosphor obtained by the thermal is plasma treatment differs from that of the starting phosphor. For example, when a red-emitting $Y_2O_3$:Eu phosphor for use in a lamp is employed as a raw material, even if the molar ratio of Eu/Y of the starting phosphor is 4.4%, the ratio of Eu/Y of the thermal-plasma treated spherical phosphor decreases to approximately 3.5%. Whereas, the ratio of Eu/Y of the ultrafine particles reaches to about 20%. As a result, light emitted from the spherical phosphor exhibits an orange color shifting from a desired red color and the luminous efficiency is reduced by approximately 20%. In the case of a Tb-activated monoclinic $Gd_2O_3$ phosphor, if a Tb concentration decreases, a blue component represented by an emission line at 415 nm increases with respect to a green component represented by an emission line at 544 nm in the emission spectrum. In order to obtain a desired green-emitting phosphor, it is necessary to set the molar ratio of Tb/Ln to a value in the range of 2 to 6%. However, the molar ratio of Tb/Ln of the obtained phosphor changes from that of the starting phosphor by the thermal plasma treatment. The degree of the change in the activator concentration varies depending on conditions of the thermal plasma treatment, such as the supply amount of the starting phosphor. However, it is impossible to completely eliminate the change in the activator concentration. Hence, in order to obtain the activator concentration of the spherical phosphor providing a desired emission color, it is necessary to control the activator concentration of the starting phosphor.

Hereinbelow, the cathode-ray tube, the fluorescent lamp, the radiation intensifying screen of the present invention using various phosphors will be individually explained.

First, we will describe the cathode-ray tube. Examples of cathode-ray tubes include a direct-view color cathode-ray tube, a direct-view cathode-ray tube for terminal display, a cathode-ray tube for use in a projection television, a cathode-ray tube for use in an x-ray image intensifier, a low voltage electron beam fluorescent display and the like.

For example, a structure of the direct-view color cathode-ray tube is shown in FIG. 1. A glass bulb 1 comprises a panel, a funnel, and a neck. The inner surface of the panel constituting the glass bulb 1, a phosphor screen 2 is formed. On the phosphor screen 2, a reflecting film (not shown) made of aluminum and the like is formed. On the rear side of the reflecting film, a shadow mask 3 is placed. To the neck of the glass bulb 1, an electron gun 4 is attached. To the outer portion of the neck, a deflecting yoke 5 is provided. The electron beam radiated from the electron gun 4 is deflected by the deflecting yolk 5 and transmits through the shadow mask 3, and irradiates on the phosphor screen 2. In FIG. 1, a cathode-ray tube has a shadow mask. Whereas, the shadow mask is not provided to a monochrome cathode-ray tube for use in the projection television or the like.

The phosphor constituting a phosphor screen of the direct color cathode-ray tube is not particularly restricted as long as the phosphor possesses the particle structure defined by the present invention and includes not only a rare earth oxide and a rare earth oxysulfide but zinc sulfide phosphors such as ZnS:Ag, ZnS:Cu, or ZnS:Cu, Au. In the phosphor screen of the direct-view cathode-ray tube formed by the phosphor of the present invention, it is easy to control the thickness of the phosphor layer and to attain a high level of brightness since the phosphor layer shows low light-scattering and high transmittance. In addition, a phosphor layer pattern can be formed in an almost the same predetermined design. Here, it is preferred that the average particle size of the transparent spherical particles be 2 to 10 $\mu$m and the content of ultrafine particles having a diameter of 0.2 $\mu$m or less be 0.01 to 0.5 wt %.

The phosphor constituting a phosphor screen of the cathode-ray tube for projection television is not particularly restricted as long as the phosphor possesses the particle structure defined by the present invention and includes not only a rare earth oxide and a rare earth oxysulfide but phosphors such as ZnS:Ag, $Y_3(Al,Ga)_5O_{12}$:Tb, $Y_2SiO_5$:Tb, $InBO_3$:Tb, $Zn_2SiO_4$:Mn, LaOCl:(Tb, Ti), and (La, Gd)OBr:Ce. These phosphors may be mixed with each other, or mixed with conventional non-spherical phosphors. The phosphor screen of the cathode-ray tube for projection television formed by the phosphor of the present invention exhibits high packing density of the phosphor since the spherical particles show good dispersion properties without aggregation. Further, since the phosphor contains the ultrafine particles having a diameter of 0.2 $\mu$m or less, the phosphor layer has strong adhesion ability to glass. Note that, it is preferred that the average particle size of the transparent spherical particles be 2 to 10 $\mu$m and the content of ultrafine particles having a diameter of 0.2 $\mu$m or less be 0.01 to 0.5 wt %. Hence, when an image is magnified and projected on a screen, it does not make conspicuous the roughness of the phosphor screen. Further, since the heat conductivity of the phosphor layer increases, elevation of temperature and deterioration of the phosphor are low even if an electron beam input is in a high level, that is, under a high load. In addition, an electron beam does not directly irradiate a glass substrate, so that the glass is colored little. Hence, light output decreases little even if the cathode-ray tube is driven for a long time.

Figure 2:
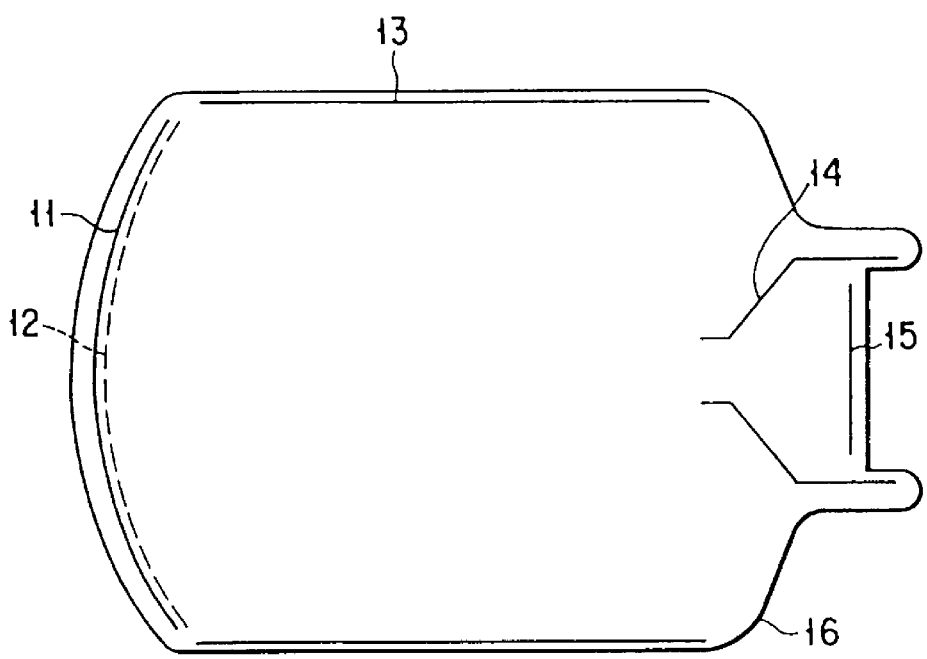
FIG. 2 is a view showing a structure of an X-ray image intensifier according to the present invention.

An X-ray image intensifier, which is one of cathode-ray tubes, is shown in FIG. 2. 16 denotes a glass bulb. An input phosphor screen 11 converts an X-ray input into visible light. A photoelectric cathode 12 releases electrons from a position receiving light. Focusing electrodes 13 form an electron lens in the glass bulb 16. An anode 14 creates a potential difference of 25 to 30 kV between the photoelectric cathode 12 and accelerates the electrons released from the photoelectric cathode 12. 15 denotes an output phosphor screen, where a phosphor layer and an aluminum film are formed successively on glass.

The present invention is directed to a phosphor used in the output phosphor screen 15. As such a phosphor, a conventional (Zn, Cu)S:Ag based zinc sulfide phosphor may be used. However, this phosphor has a drawback in that when the particle size is set to a value less than 1 $\mu$m, the luminous efficiency severely decreases. In contrast, the rare earth oxide phosphor and the rare earth oxysulfide phosphor of the present invention show a smaller decrease in the luminous efficiency, and therefore can be suitably used. More specifically, by virtue of good dispersion properties of the spherical phosphor particles, the phosphor of the present invention can provide a uniform phosphor screen having a high packing density. Further, owning to a spherical shape, the phosphor particles contact to glass by almost a point. Due to the point contact, the degree of optical coupling decreases, with the result that the amount of a component emitted in a direction parallel to the glass decreases as compared to a phosphor having a non-spherical shape. Consequently, resolution, contrast and output are improved. To improve the resolution, it is desirable that a phosphor has a small particle size. However, when the phosphor has an excessively small particle size, the luminous efficiency decreases. Hence, it is desirable that the average particle size of the phosphor be 0.5 to 3 $\mu$m. Further, by virtue of the ultrafine particles of 0.2 $\mu$m or less attached onto the spherical particles, the phosphor shows sufficient dispersion and fluidity in the formation of the phosphor layer by the settling method, the centrifugal method or the electrode position method, and the formed phosphor layer has strong adhesion ability. The cathode-ray tubes, wherein at least a part of the phosphor constituting the phosphor screen possesses the particle structure defined by the present invention, show a part of the merits described above, even if the conventional non-spherical phosphors are used as the counterpart of a phosphor mixture or as color components different from that of the phosphor possessing the particle structure defined by the present invention.

Hereinbelow, the fluorescent lamp according to the present invention will be explained. A structure of the fluorescent lamp is shown in FIG. 3. In the inner surface of a glass tube 21, a phosphor layer 22 is formed. At the end portions of the glass tube 21, electrodes 23 for discharge are formed. In the glass tube 21, a rare gas and mercury are charged. The fluorescent lamp is not restricted to a straight tube, and a circular or a compact-type tube may be used.

The phosphor of the present invention exhibits no aggregation and good dispersion properties. Since the phosphor of the present invention contains ultrafine particles and shows good fluidity, a uniform mixing can be attained when the phosphor of the present invention is blended with two or more types of another phosphors, leading to a dense phosphor screen. Hence, mismatching in the fluorescent color between both ends of the fluorescent lamp is negligible. Here, it is preferred that the average particle size of the transparent spherical particles be 0.5 to 10 $\mu$m and the content of ultrafine particles having a diameter of 0.2 $\mu$m or less be 0.01 to 2 wt %. The phosphor constituting a phosphor layer of the fluorescent lamp is not particularly restricted as long as the phosphor has a particle structure defined by the present invention. For example, blue-emitting phosphors such as $CaWO_4$, $CaWO_4$:Pb, $BaMg_2Al_{16}O_{27}$:Eu, and (Sr, Ca)$_{10}$(PO$_4$)$_6$Cl$_2$:Eu, green-emitting phosphors such as $LaPO_4$:(Ce, Tb), $CeMgAl_{11}O_{19}$:Tb, and $Zn_2SiO_4$:Mn, and red-emitting phosphors such as $Y_2O_3$:Eu, and Y(P,V)O$_4$:Eu may be used.

The aforementioned monoclinic $Gd_2O_3$:Eu phosphor has an emission peak near 623 nm and can be suitably used in a fluorescent lamp utilizing a phosphor mixture. To be more specific, if the phosphor layer is formed by a phosphor mixture mainly consisting of the phosphor of the present invention, a red-emitting europium-activated yttrium oxide phosphor having an emission peak near 611 nm, a green-emitting phosphor having an emission peak in the range of 540 to 570 nm, and a blue-emitting phosphor having an emission peak near 450 nm, $R_9$ of the fluorescent lamp can be improved. In this case, the green-emitting phosphor is at least one selected from the group consisting of a cerium terbium-activated lanthanum phosphate phosphor and a cerium terbium-activated barium magnesium aluminate phosphor. The blue-emitting phosphor is at least one selected from the group consisting of a divalent europium-activated barium magnesium halophosphate phosphor, a divalent europium-manganese-coactivated barium magnesium halophosphate phosphor and a divalent europium-activated barium calcium strontium halophosphate phosphor. The contents of the above phosphors vary depending on what degree the correlated color temperature of the fluorescent lamp is set to. A desired fluorescent lamp can be usually obtained when the blue-emitting phosphor is contained in an amount of 10 to 50 wt %; the green-emitting phosphor in an amount of 20 to 45 wt %; a sum of the $Gd_2O_3$:Eu phosphor and the $Y_2O_3$:Eu phosphor in an amount within the range of 30 to 76 wt %.

Note that, since a cubic $Gd_2O_3$:Eu phosphor has an emission peak near 611 nm similar to that of a $Y_2O_3$:Eu phosphor, it can be used in place of the $Y_2O_3$:Eu phosphor without any adverse effect on the color rendering properties. Therefore, the $Gd_2O_3$:Eu phosphor of the present invention does not necessarily belong to entirely monoclinic system and may contain cubic system particles as long as it contains the monoclinic system in an amount of approximately 5% or more.

The phosphor of the present invention can be suitably used in a fluorescent lamp having a tube diameter of 8 mm or less. Since the phosphor particles are excellent in dispersion properties and fluidity, they do not cause clogging of a nozzle when the small-diameter fluorescent lamp is formed by coating the phosphor by means of the syringe injection method or the sucking method under reduced pressure. Owning to this advantage, a uniform phosphor layer can be easily obtained.

The fluorescent lamp of the present invention is useful when it is used in combination with a reflecting film as is in the case of a light-guide type back light of a liquid crystal display. A structure of the liquid crystal display having a light-guide type back light in which a fluorescent lamp is installed is shown in FIG. 4. 31 denotes a fluorescent lamp. 32 is a reflecting film. 33 is a light-guide plate. 34 is a diffusion plate. 35 is a liquid crystal display panel. 36 is a lamp cover. Light radiated from the fluorescent lamp 31 in directions other than the direction toward the light guide plate 33 converges in a direction of the light guide plate 33 being reflected by means of the reflecting film 32. In this case, it is preferable that ⅓ or more of the outer surface of a glass tube of the fluorescent lamp be covered with a reflecting material having reflectance of 50 to 98%. When the reflecting material covers ⅓ or less or the reflecting material has reflectance of 50% or less, the light convergence effect is low and it is no use employing the reflecting material. Actually, there is no reflecting material having reflectance in excess of 98%. The most light reflected by the film 32 satisfying the above conditions transmits across the fluorescent lamp 31 and converges in a direction of the light guide plate 33. The phosphor layer of the fluorescent lamp of the present invention has a higher level of transmittance compared to a phosphor layer formed of conventional phosphors, since it is mainly formed of spherical particles. In the fluorescent lamp of the present invention, even if overall light output is equal, light output converging in a direction of the light guide plate is larger by 10% compared to the fluorescent lamp using a conventional phosphor. In addition, as described above, the fluorescent lamp of the present invention can be easily manufactured even if a tube diameter is 8 mm or less. This feature is advantageous in forming a thin liquid crystal display. The fluorescent lamps, wherein at least a part of the phosphor constituting the phosphor layer possesses the particle structure defined by the present invention, show a part of the merits described above, even if the conventional non-spherical phosphors are used as the counterpart of a phosphor mixture.

Hereinbelow, the radiation intensifying screen will be explained. A structure of the radiation intensifying screen is shown in FIG. 5. 41a and 41b are radiation intensifying screens (41a is a front intensifying screen and 41b is a back intensifying screen). 42 denotes a photographic film. 43 is a radioactive ray which has been transmitted through an object to be photographed. The radiation intensifying screens 41a and 41b comprise a phosphor layer 45 and a protection film 46 mounted on a screen base 44. The phosphor of the intensifying screens 41a and 41b emits luminescence by input radiation. The luminescence efficiently irradiates a photographic film on both sides. The phosphor constituting the phosphor layer is not particularly restricted as long as the phosphor possesses the structure defined by the present invention. Examples of the phosphor include not only a tungstate phosphor, a rare earth oxysulfide phosphor, and a rare earth oxide phosphor but $Ba_{1-x}Sr_xFCl_{1-y}Br_y$:Eu (x=0–1, y=0–1), $BaSO_4$:Eu, LaOBr:R (R=Tb, Tm), $HfP_2O_7$, $Hf_3(PO_4)_4$, $YTaO_4$, $GaTaO_4$ and the like.

When a photograph is taken by use of a radiation intensifying screen employing a phosphor having an average particle size of 20 μm or more, a uniform and smooth image is not obtained. It is preferable that the ultrafine particles be contained in the phosphor in an amount of 0.01 to 2 wt %. As described above, if the phosphor layer is formed by using the phosphor of the present invention, the brightness of the phosphor layer will be improved. Since sufficient brightness can be attained, the phosphor layer can be thinned, with the result that the radiation image having high level of sharpness can be obtained.

Further, since the phosphor of the present invention contains ultrafine particles inducing good dispersion properties, a uniform phosphor layer can be formed. Hence, using two types of phosphors whose average particle sizes are different, a radiation intensifying screen having a double-layered phosphor layer can be easily manufactured. In addition, by use of the ultrafine particles contained in the phosphor of the present invention, a radiation intensifying screen having the double-layered phosphor layer can be manufactured even if phosphor particles having different sizes are not used. More specifically, the method comprises the steps of providing a phosphor containing the ultrafine particles in a relatively large amount (approximately 1 wt %); dispersing the particles of several μm in size and ultrafine particles by means of an ultrasonic vibration; and, thereafter, forming a phosphor layer on a protection film by the settling method. By this method, the layer made of the ultrafine particles is formed on the side of the screen base, and a dense layer made of a phosphor mixture consisting of the particles of several μm and the ultrafine particles on the former layer. In this case, the radiation intensifying screen can be obtained in less steps than a method employing two types of phosphors having different sizes. Besides this, the sensitivity and sharpness of the radiation image are improved.

The radiation intensifying screens, wherein at least a part of the phosphor constituting the phosphor screen possesses the particle structure defined by the present invention, show a part of the merits described above, even if the conventional non-spherical phosphors are used as the counterpart of a phosphor mixture or as a layer different from that of the phosphor possessing the particle structure defined by the present invention.

EXAMPLES

Hereinbelow, the Examples of the present invention will be described in detail.

(Example 1)

Figure 6:
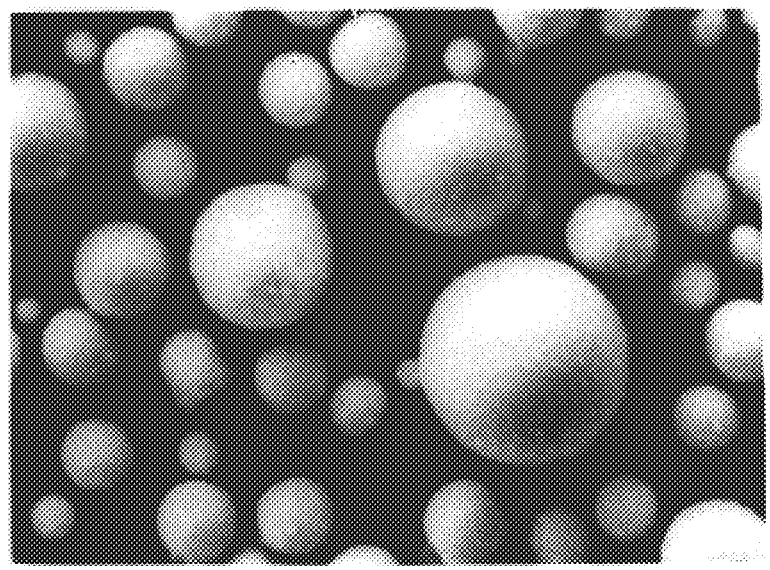
FIG. 6 is an electron microphotograph showing a particle structure of a rare earth oxide phosphor of Example 1 of the present invention.

As a raw material, a conventional non-spherical $Y_2O_3$:Eu phosphor was used. The average particle size of the starting phosphor was 4.5 μm as measured by the Blaine method. The starting phosphor was supplied into high frequency plasma with an argon gas serving as a carrier gas, fused, and quenched, thereby obtaining the phosphor according to the present invention. The average particle size of the obtained phosphor was 4.8 μm as measured by the Blaine method. An electron microphotograph of the obtained phosphor is shown in FIG. 6. The ratio of the major diameter to the minor diameter with respect to individual phosphor particles fell within the range of 1.00 to 1.10 as measured from the electron microphotograph. The X-ray diffraction pattern of the phosphor was equivalent to that of $Y_2O_3$. The powder brightness of the phosphor excited by an electron beam was 98% based on that of the starting phosphor as measured under an accelerating voltage of 10 kV and a current density of 1 μA/cm².

Subsequently, using the obtained phosphor, a phosphor screen was formed with a coating weight of 7 mg/cm² on the inner surface of a glass bulb by means of the settling method. An aluminum backing was provided and an electron gun was installed, followed by evacuation and sealing, thereby obtaining a 7-inch projection cathode-ray tube. The brightness of the projection cathode-ray tube was 790 ft-L as measured under a voltage of 30 kV and a beam current of 200 μA. This value was 5% higher than the brightness, 750 ft-L, of a cathode-ray tube formed in the same manner as above using the starting phosphor.

(Example 2)

A precipitate obtained by co-precipitating a mixed oxalate was fired to decompose at 900° C., and then the resultant product was fired at 1100° C. using an alkali earth halide as a flux, thereby obtaining a $La_2O_3$:Pr phosphor having a Pr concentration of 0.1 mol %. The average particle size of the starting phosphor was 6.8 μm as measured by the Blaine method. The starting phosphor was supplied into high frequency plasma with an argon gas serving as a carrier gas, fused, and quenched, thereby obtaining the phosphor according to the present invention, in the same manner as in Example 1. The average particle size of the obtained phosphor was 7.3 μm as measured in the Blaine method. The ratio of the major diameter to the minor diameter with respect to individual phosphor particles fell within the range of 1.00 to 1.15 as measured from an electron microphotograph. In addition, the phosphor contained ultrafine particles in an amount of 0.3 wt %. The powder brightness of the phosphor was 78% based on that of the starting phosphor as measured in the same conditions as in Example 1. It is presumed that such a low powder brightness is ascribed to that Pr was oxidized to some extent. The emission color was green, showing a spectrum having peaks near 510 nm and near 670 nm. The emitted color was consistent with that of the starting phosphor.

Subsequently, using the obtained phosphor, a phosphor screen was formed with a coating weight of 11 mg/cm² on the inner surface of a glass bulb by means of the settling method. An aluminum backing was provided and an electron gun was installed, followed by evacuation and sealing, thereby obtaining a 7-inch projection cathode-ray tube. The brightness of the projection cathode-ray tube was 300 ft-L as measured under a voltage of 30 kV and a beam current of 200 μA. This value was 20% higher than the brightness, 250 ft-L, of a cathode-ray tube formed in the same manner as above using the starting phosphor. As described above, despite that the phosphor in this Example has low powder brightness as compared to that of the starting phosphor, the brightness of the cathode-ray tube using the phosphor is high. This is because the shape of the phosphor particles is nearly complete sphere.

(Example 3)

A precipitate obtained by coprecipitating a mixed oxalate was fired to decompose at 900° C., the resultant product was fired at 1400° C. without using a flux, thereby obtaining a $Gd_2O_3$:Eu phosphor having an Eu concentration of 5 mol %. The X-ray diffraction of the obtained phosphor was measured. Although most part of the phosphor was monoclinic $Gd_2O_3$, a cubic $Gd_2O_3$ pattern was also observed in an amount of 5% judging from a comparison of respective maximum peaks. The average particle size of the starting phosphor was 3.5 μm as measured by the Blaine method. The phosphor was relatively aggregated. The starting phosphor was supplied into high frequency plasma with an argon gas serving as a carrier gas, fused, and quenched, thereby obtaining the phosphor according to the present invention. The average particle size of the obtained phosphor was 4.2 μm as measured by the Blaine method. The ratio of the major diameter to the minor diameter with respect to individual phosphor particles fell within the range of 1.00 to 1.18 as measured from an electron microphotograph. When the X-ray diffraction pattern of the obtained phosphor was measured, the pattern was consistent with that of monoclinic $Gd_2O_3$ and no pattern of cubic $Gd_2O_3$ was observed. It was confirmed that the starting phosphor was almost completely converted to the monoclinic $Gd_2O_3$:Eu phosphor. The powder brightness of the obtained phosphor was 95% based on that of the starting phosphor as measured when the phosphor was excited by ultraviolet radiation of 254 nm in wavelength.

Subsequently, the obtained phosphor was coated onto the inner surface of a glass tube using nitrocellulose binder, thereby forming a fluorescent lamp having a rated power of 40 W. Further, the same lamp as above was formed using the starting phosphor. The luminous fluxes of both fluorescent lamps were measured under the rated input. As a result, the fluorescent lamp of Example 3 exhibited a 3% higher value than that made of the starting phosphor.

(Example 4)

Figure 7:
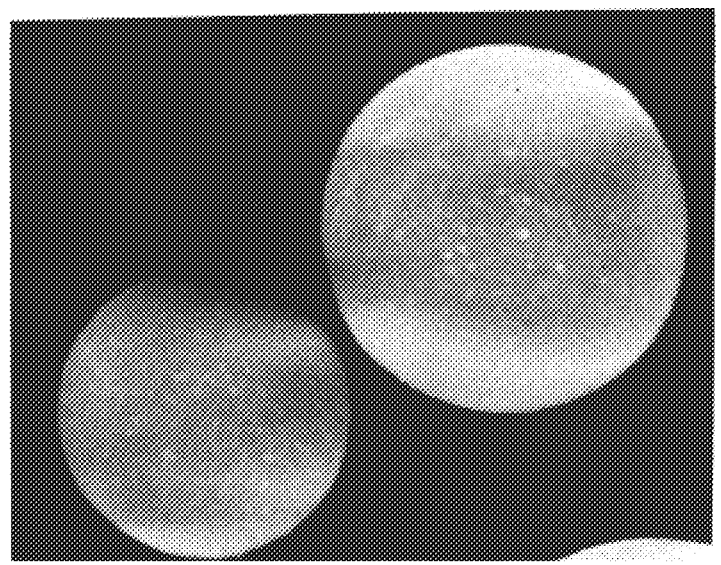
FIG. 7 is an electron microphotograph showing a particle structure of a rare earth oxide phosphor of Example 4 of the present invention.

A $Gd_2O_3$:Eu phosphor belonging to a cubic crystalline system was used as a raw material. The average particle size of the starting phosphor was 3.4 µm as measured by the Blaine method. The starting phosphor was supplied into a high frequency plasma torch with a mixed gas of argon and oxygen as a carrier gas, fused, and quenched, thereby obtaining the phosphor powder sample. The phosphor powder was suspended in water, subjected to ultrasonic vibration, and allowed to stand still. After the supernatant was removed, followed by vacuum filtration, the resultant material was dried at 100° C., thereby obtaining the phosphor of the present invention. The average particle size of the obtained phosphor was 3.6 µm as measured by the Blaine method. An electron microphotograph of the obtained phosphor is shown in FIG. 7. The ratio of the major diameter to the minor diameter with respect to individual phosphor particles fell within the range of 1.00 to 1.10 as measured from the electron microphotograph. The phosphor contained ultrafine particles having a size of 0.2 µm or less in an amount of 0.02 wt %. The X-ray diffraction pattern of this phosphor exhibited that of a monoclinic system which was entirely different from that of the starting phosphor. The emission spectrum of the phosphor was measured while the phosphor was excited by an electron beam under an acceleration voltage of 10 kV and a current density of 1 µA/cm$^2$ or by ultraviolet radiation having a wavelength of 254 nm. The results were as follows: a main emission wavelength: 623 nm; and chromaticity: x=0.63, y=0.35. These values varied from those of starting phosphor: a main emission wavelength: 611 nm; and chromaticity: x=0.62 and y=0.36.

Subsequently, using the obtained phosphor, a phosphor screen was formed with a coating weight of 7 mg/cm$^2$ on the inner surface of a glass bulb by means of the settling method. An aluminum backing was provided and an electron gun was installed, followed by evacuation and sealing, thereby obtaining a 7-inch projection cathode-ray tube. The brightness of the projection cathode-ray tube was 3500 ft-L as measured under a voltage of 29 kV and a beam current of 1500 µA. This value was 30% higher than the brightness, 2700 ft-L, of a cathode-ray tube formed in the same manner as above using a monoclinic Gd$_2$O$_3$:Eu phosphor obtained by firing at 1300° C. followed by quenching.

(Example 5)

A Y$_2$O$_3$:Eu phosphor belonging to a cubic crystalline system was used as a raw material. The molar ratio of Eu/Y was 4.4%. The average particle size of the starting phosphor was 3.2 µm as measured by the Blaine method. The starting phosphor was supplied into a high frequency plasma torch with a mixed gas of argon and oxygen as a carrier gas, fused, quenched, and recovered by a cyclone, thereby obtaining the phosphor consisting of near spherical particles. The phosphor was suspended in water, subjected to ultrasonic vibration, and allowed to stand still. After the supernatant was removed, followed by vacuum filtration, the resultant phosphor was dried. The resultant phosphor contained a trace amount of phosphor particles belonging to the monoclinic system besides the cubic system. In addition, this phosphor contained ultrafine particles having a size of 0.2 µm or less in an amount of 0.1%. The phosphor was further fired for 2 hours at 1100° C. in air. The resultant phosphor consisted of particles of cubic system alone. The average particle size of the obtained phosphor was 3.8 µm as measured by the Blaine method. The ratio of the major diameter to the minor diameter with respect to individual phosphor particles fell within the range of 1.00 to 1.10 as measured from an electron microphotograph. The ultrafine particles were fused to some degree, and grew to deposit onto the surface of the phosphor particles. The deposited amount was approximately 0.1%. The molar ratio of Eu/Y was 3.5%. The emission spectrum of the phosphor was measured while the phosphor was excited by an electron beam under an acceleration voltage of 10 kV and a current density of 1 µA/cm$^2$ or by ultraviolet radiation having a wavelength of 254 nm. The main emission wavelength was 611 nm, which was consistent with that of the starting phosphor. However, the luminous efficiency of the obtained phosphor was 110% as excited by the electron beam and 80% as excited by the ultraviolet radiation, based on those of the starting phosphor.

Subsequently, using the obtained phosphor, a phosphor screen was formed with a coating weight of 7 mg/cm$^2$ on the inner surface of a glass bulb by means of the settling method. An aluminum backing was provided and an electron gun was installed, followed by evacuation and sealing, thereby obtaining a 7-inch projection cathode-ray tube. There were no peeling-off from the screen formed by the settling, and no problem such as poor resistance to breakdown caused by vibration after completion of cathode-ray tube formation. The brightness of the projection cathode-ray tube was 5300 ft-L as measured under a voltage of 29 kV and a beam current of 1500 µA. This value was 13% higher than the brightness, 4700 ft-L, of a cathode-ray tube formed in the same manner as above using the starting phosphor before subjecting to the thermal plasma treatment.

(Example 6)

Onto a color cathode-ray tube panel of 25 inch, phosphor stripes were provided using commercially available non-spherical blue-emitting phosphor and green-emitting phosphor. The phosphor formed in Example 4 as a red-emitting phosphor was coated on the panel by a conventional method. The coating weight was 4.0 mg/cm$^2$ as measured after the phosphor screen was subjected to the ultraviolet-light exposure and development processes. When the sharpness of the stripe edges on the phosphor screen was visually observed, it earned a maximum score of 10 points. When the monoclinic Gd$_2$O$_3$:Eu phosphor obtained by firing at 1300° C. followed by quenching was used, the coating weight was 3.1 mg/cm$^2$, and the sharpness score was 7 points. Subsequently, organic material filming, aluminum film deposition and baking were performed. A funnel and an electron gun were attached, followed by evacuation and sealing, thereby manufacturing a cathode-ray tube. The brightness of red-emission of the cathode-ray tube was 120% based on that of a cathode-ray tube formed in the same manner as above, using the monoclinic Gd$_2$O$_3$:Eu phosphor which was obtained by firing at 1300° C. followed by quenching.

It was determined that a range of color reproduction of the cathode-ray tube is wider by about 7% as compared to that of either the cubic Gd$_2$O$_3$:Eu that is the starting phosphor in Example 4 or the cubic Y$_2$O$_3$:Eu that is the starting phosphor in Example 5.

(Example 7)

Figure 8:
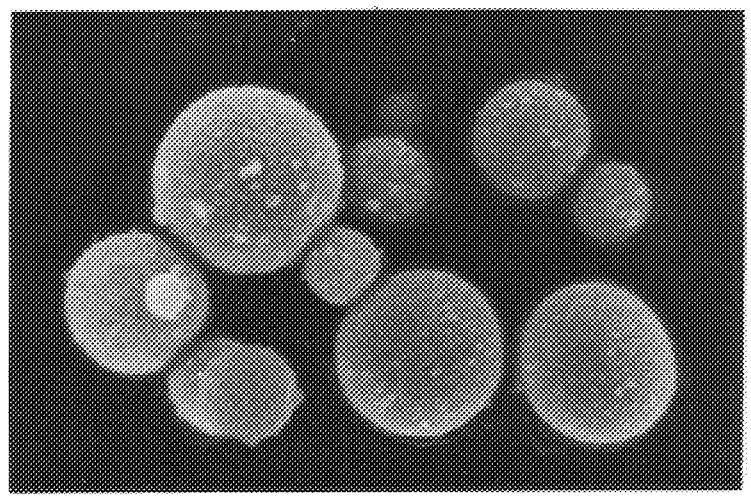
FIG. 8 is an electron microphotograph showing a particle structure of a rare earth oxide phosphor of Example 7 of the present invention.

The Gd$_2$O$_3$:Eu phosphor belonging to a cubic crystalline system as the same as used in Example 4 was used as a raw material. The starting phosphor was supplied into a direct-current plasma torch for use in a plasma spraying with an argon gas as a carrier gas, fused, and quenched by injecting into water, thereby obtaining the phosphor of the present invention. The average particle size of the obtained phosphor was 4.2 µm as measured by the Blaine method. The phosphor contained ultrafine particles of 0.2 µm or less in an amount of 0.05 wt %. An electron microphotograph of the obtained phosphor is shown in FIG. 8. The phosphor was slightly inferior in the spherical degree to that prepared by the high frequency thermal plasma method in Example 4. The ratio of the major diameter to the minor diameter with respect to individual particles fell within the range of 1.00 to 1.30. The phosphor particles having the value in the above range were substantially regarded as near spherical. The X-ray diffraction pattern of this phosphor, which was entirely different from that of the starting phosphor, exhibited that of a monoclinic system.

Subsequently, a phosphor screen was formed with a coating weight of 7 mg/cm$^2$ on the inner surface of a glass bulb by means of the settling method using the obtained phosphor. An aluminum backing was provided and an electron gun was installed, followed by evacuation and sealing, thereby obtaining a 7-inch projection cathode-ray tube. The brightness of the projection cathode-ray tube was 3400 ft-L as measured under a voltage of 29 kV and a beam current of 1500 μA. This value was 6% higher than the brightness, 3200 ft-L, of a cathode-ray tube formed in the same manner as above using the starting phosphor.

(Example 8)

A Gd$_2$O$_3$:Tb phosphor containing 5 mol % of Tb and belonging to a cubic crystalline system was used as a raw material for the thermal plasma treatment. The average particle size of the starting phosphor was 3.5 μm. The starting phosphor was supplied into a high frequency plasma torch with an argon gas as a carrier gas, fused, quenched and recovered by means of a cyclone, thereby obtaining the phosphor of the present invention. The average particle size of the obtained phosphor was 4.2 μm. The ratio of the major diameter to the minor diameter with respect to individual phosphor particles fell within the range of 1.00 to 1.10 as measured from an electron microphotograph. The phosphor contained ultrafine particles of a size of 0.2 μm or less in an amount of 0.2 wt %. The X-ray diffraction pattern of this phosphor was of a monoclinic system which was entirely different from that of the starting phosphor.

Subsequently, when the phosphor was excited by an electron beam under an acceleration voltage of 10 kV and a current density of 1 μA/cm$^2$, the emission was green. The luminous efficiency was three times higher than that of the cubic starting phosphor.

Thereafter, a 7-inch projection cathode-ray tube was formed in the same manner as in Example 4. The brightness of the projection cathode-ray tube was 3.5 times higher than that of a cathode-ray tube formed using the starting phosphor under a voltage of 29 kV and a beam current of 1500 μA.

(Example 9)

A Gd$_2$O$_3$:Pr phosphor belonging to a cubic crystalline system was used as a raw material for the thermal plasma treatment. The average particle size of the starting phosphor was 3.2 μm as measured by the Blaine method. The starting phosphor was supplied into a high frequency plasma torch with an argon gas as a carrier gas, fused, and quenched, thereby obtaining the phosphor of the present invention. The average particle size of the obtained phosphor was 3.8 μm as measured by the Blaine method. The ratio of the major diameter to the minor diameter with respect to individual phosphor particles fell within the range of 1.00 to 1.10 as measured from an electron microphotograph. The X-ray diffraction pattern of this phosphor exhibited a monoclinic system which was entirely different from that of the starting phosphor. The emission spectrum of the phosphor was measured while the phosphor was excited by an electron beam under an acceleration voltage of 10 kV and a current density of 1 μA/cm$^2$ or by ultraviolet radiation having a wavelength of 254 nm. Consequently, the emission color was green, and chromaticity thereof was x=0.31 and y=0.51. These values varied from those of starting phosphor exhibiting red emission color and chromaticity of x=0.64 and y=0.28.

Subsequently, a phosphor screen was formed with a coating weight of 7 mg/cm$^2$ on the inner surface of a glass bulb by means of the settling method using the obtained phosphor. An aluminum backing was provided and an electron gun was installed, followed by evacuation and sealing, thereby obtaining a 7-inch projection cathode-ray tube. The brightness of the projection cathode-ray tube was 580 ft-L as measured under a voltage of 29 kV and a beam current of 1500 μA. This value was 16% higher than the brightness, 500 ft-L, of a cathode-ray tube formed in the same manner as above using a monoclinic Gd$_2$O$_3$:Pr phosphor which was obtained by firing at 1300° C. followed by quenching.

(Comparative Example 1)

A slurry was prepared by blending a commercially available divalent europium-activated barium calcium strontium halophosphate phosphor, a commercially available cerium terbium-activated lanthanum phosphate phosphor, and a commercially available europium-activated yttrium oxide phosphor whose shape was not spherical. The slurry was coated on the inner surface of a glass tube having 32 mm in diameter to form a 40 W conventional three-band type straight fluorescent lamp having chromaticity on black body locus at a color temperature of 5000K. Total luminous flux at the lighting-up time of zero was 3640 lumen, and a specific color rendering index of R$_9$ was 35.

(Comparative Example 2)

A co-precipitate of gadolinium and europium oxalate was fired to decompose at 900° C., the resultant product was fired at 1400° C. using an alkali earth halide as a flux, thereby obtaining a Gd$_2$O$_3$:Eu phosphor containing 5 mol % of Eu. By measuring the X-ray diffraction, it was found that the starting phosphor is converted to an almost complete monoclinic system. The average particle size of the phosphor was 3.5 μm as measured by the Blaine method.

Subsequently, three types of phosphors described in Comparative Example 1 were blended with the Gd$_2$O$_3$:Eu phosphor and then a 5000K and 40 W straight fluorescent lamp was formed. Total luminous flux at the lighting-up time of zero was 3580 lumen, and the specific color rendering index of R$_9$ was 47.

As compared to the fluorescent lamp of Comparative Example 1, the total luminous flux was lower by 1.6%, but R$_9$ was higher by 12 points. This data demonstrated that improvement in R$_9$ by 10 points inevitably accompanied a decrease in the total luminous flux by 1.4%.

(Example 10)

Figure 9:
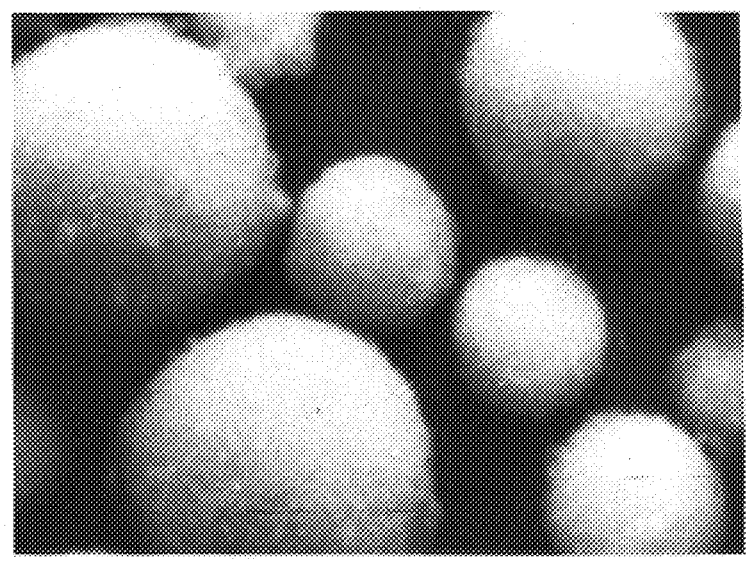
FIG. 9 is an electron microphotograph showing a particle structure of a rare earth oxide phosphor of Example 10 of the present invention.

A co-precipitate of gadolinium and europium oxalate as the same as used in Comparative Example 2 was fired to decompose at 1000° C., thereby obtaining a Gd$_2$O$_3$:Eu powder. The obtained powder exhibited a diffraction pattern of a cubic system as measured by the x-ray diffraction. Thereafter, the powder was supplied into a high frequency plasma torch with a mixed gas of argon and oxygen as a carrier gas, fused and quenched, thereby obtaining the phosphor of the present invention. The average particle size of the phosphor was 1.5 μm as measured by the Blaine method. An electron microphotograph of the obtained phosphor is shown in FIG. 9. The ratio of the major diameter to the minor diameter with respect to individual phosphor particles fell within the range of 1.00 to 1.15 as measured from the electron microphotograph. From the ratio of the X-ray diffraction peaks of this phosphor, the ratio of the cubic system to the monoclinic system thereof was calculated. It was found that the monoclinic system was contained in an amount of approximately 80%.

Subsequently, three types of phosphors in Comparative Example 1 were blended with the $Gd_2O_3$:Eu phosphor of the present invention and a 5000K and 40 W straight fluorescent lamp was formed. The $Gd_2O_3$:Eu phosphor was blended in a ratio of 20 wt %. Total luminous flux at the lighting-up time of zero was 3570 lumen, and a specific color rendering index for red color $R_9$ was 55. As compared to the fluorescent lamp of Comparative Example 1, the total luminous flux was lower by 2.0%, but $R_9$ was higher by 20 points. This data demonstrated that to improve $R_9$ by 10 points the total luminous flux decreases by only 1.0%.

(Example 11)

Figure 10:
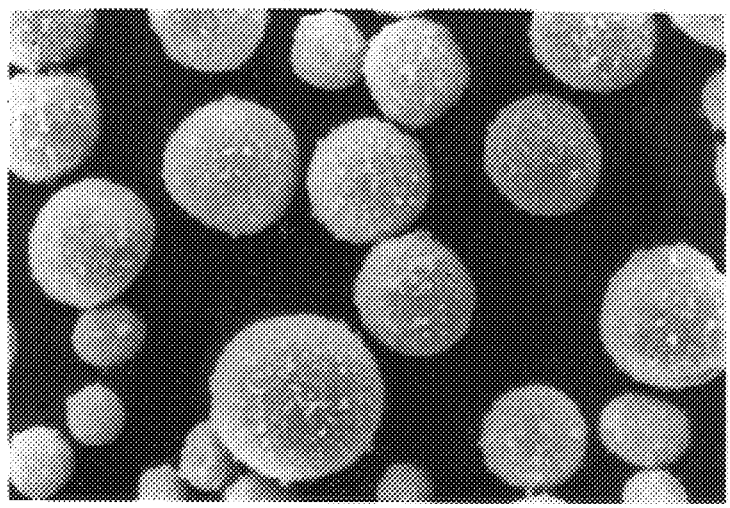
FIG. 10 is an electron microphotograph showing a particle structure of a rare earth oxysulfide phosphor of Example 11 of the present invention.

As a raw material, use was made of $Y_2O_2S$:Eu formed by a flux method as the same as red-emitting phosphor for use in a color TV. The molar ratio of Eu/Y was set to 8.0%. The average particle size of the starting phosphor was 4.1 μm. The starting phosphor was washed while being stirred in a 1/40 diluted aqueous nitric acid solution for 20 minutes, followed by vacuum filtration. After water was replaced with alcohol, the resultant phosphor was dried. To the obtained sample, sulfur was added in an amount of 2 wt %, and then the sample was introduced into a 4 MHz high frequency plasma torch under an argon atmosphere, quenched and recovered by a cyclone. To the resultant sample placed in water, an ultrasonic vibration was applied. After the sample was allowed to stand still, the supernatant was removed, thereby obtaining spherical particles. On the surface of the spherical particles, ultrafine particles of approximately 0.1 μm in size was contained in an amount of 0.05 wt %. The body color of the spherical particles was grey-purple. The reflectance for visible light was 40%. Further, the spherical particles were fired for one hour at 900° C. in an sulfur atmosphere, thereby obtaining the phosphor of the present invention. An electron microphotograph is shown in FIG. 10. The phosphor consisted of spherical particles having an average particle size of 4.5 μm. The ratio of the major diameter to the minor diameter with respect to individual phosphor particles fell within the range of 1.00 to 1.10 as measured from the electron microphotograph. The body color of the phosphor was white and the reflectance for visible light thereof was 94%. The X-ray diffraction pattern of this phosphor was consistent with that of an oxysulfide compound. The molar ratio of Eu/Y of the phosphor was 3.7%. When the phosphor was excited by an electron beam under an accelerating voltage of 10 kV and a current density of 0.5 pA/cm², the emission color was red suitable for a color TV.

Onto a color cathode-ray tube panel of 25 inch, phosphor stripes were formed by using commercially available non-spherical blue-emitting and green-emitting phosphor, and then the phosphor obtained in Example 11 serving as a red-emitting phosphor was coated by the conventional method. The transmittance of the phosphor layer for the ultraviolet ray having wavelength of 420 to 350 nm for exposure was 3%. After the phosphor screen was subjected to exposure and development, the coating weight was 4.0 mg/cm². When the sharpness at edge portions of phosphor stripes was visually observed, it earned a maximum score of 10 points. In contrast, the phosphor layer formed of a red-emitting phosphor for use in a color TV with no thermal plasma treatment exhibited transmittance for the ultraviolet ray of 1%, a coating weight of 3.5 mg/cm², and a sharpness score of 9 points. Subsequently, organic material filming, aluminum film deposition and baking were performed. A funnel and an electron gun were attached, followed by evacuation and sealing, thereby manufacturing a cathode-ray tube. The red-emission brightness of the cathode-ray tube was 120% based on that of a cathode-ray tube formed in the same manner as above using a $Y_2O_2S$:Eu red-emitting phosphor having an Eu/Y molar ratio of 3.7%, which was not plasma-treated.

(Comparative Example 3)

As a raw material, use was made of a red-emitting phosphor $Y_2O_2S$:Eu for use in a color TV. The molar ratio of Eu/Y was 4.1%. The average particle size of the starting phosphor was 4.3 μm. The starting phosphor was washed while being stirred in a 1/40° diluted aqueous nitric acid solution for 20 minutes, followed by vacuum filtration. After water was replaced with alcohol, the resultant phosphor was dried. The obtained sample was introduced into a 4 MHz high frequency plasma torch and quenched. To the resultant sample, an ultrasonic vibration was applied in water and allowed to stand still. After removing the supernatant, spherical particles were obtained. The body color of the spherical particles was grey-purple. The reflectance for visible light was 8%. Further, this sample was fired for one hour at 900° C. in a sulfur atmosphere in the same manner as in Example 11. The body color of this phosphor was white and the molar ratio of Eu/Y was 1.8. The emission color under an electron excitation was orange, which was not suitable for use in a color TV.

(Example 12)

As a raw material, use was made of $Y_2O_2S$:Tb having an average particle size of 1.5 μm formed by the flux method. The molar ratio of Tb/Y was 6.5%. To the starting phosphor, a 1/100 diluted aqueous Tamol solution was added, followed by vacuum filtration. After water was replaced with alcohol, the resultant phosphor was dried. To the obtained sample, sulfur was added in an amount of 3 wt %, and then the sample was introduced into a 4 MHz high frequency plasma torch under an argon atmosphere, quenched and recovered by a cyclone. To the resultant sample, an ultrasonic vibration was applied in water and allowed to stand still. After removing the supernatant, spherical particles were obtained. The obtained phosphor contained ultrafine particles in an amount of 0.05%. The body color of the sample exhibited human-skin color. The reflectance for visible light was 50%. Further, the sample was fired for one hour at 900° C. in a sulfur atmosphere in the same manner as in Example 11, thereby obtaining the phosphor of the present invention. The phosphor comprised white spherical particles having an average particle size of 1.2 μm and detectable ultrafine particles in an amount of 0.02%. The reflectance for visible light of the phosphor was 91% and the molar ratio of Tb/Y was 3.5%. In the emission spectrum by electron excitation, the intensity of a 544 nm band was 10 times stronger than that of a 415 nm band, and green emission was resulted.

This phosphor was deposited on a glass substrate having a diameter of 25 mm by the settling method using potassium sulfate and potassium silicate, thereby forming a phosphor layer. Subsequently, an organic material filming, aluminum film deposition and baking were performed. The obtained phosphor screen on the glass substrate was mounted to a glass bulb for X-ray image intensifier having a 9-inch input screen as an output screen, and the bulb was evacuated and sealed, thereby obtaining an x-ray image intensifier. When the X-ray image intensifier was driven in a cathode voltage of 25 kV, the resolution on the output screen was 55 line pairs/cm in a center thereof and the light output was 80 nit per 1 mR/sec of X-ray input. In a similar way, an X-ray image intensifier was manufactured using the starting $Y_2O_2S:Tb$ phosphor, consisting of the non-spherical particles. The resolution of this X-ray image intensifier was 40 line pairs/cm and the light output was 75 nit.

(Example 13)

Each of the $Y_2O_3:Eu$ phosphor used as a raw material in Example 1 and the spherical $Y_2O_3:Eu$ phosphor in Example 1 was individually coated on an inner surface of a glass tube having an inner diameter of 4.5 mm in a coating weight 6 mg/cm² by the sucking method under reduced pressure, thereby forming cold cathode fluorescent lamps having a length of 150 mm. 50% of the outer surface of the lamp was covered with a reflecting film having reflectance of 80%. When these fluorescent lamps were turned on under an input power of 2 W, the difference in brightness between both ends of the fluorescent lamp using the starting phosphor of Example 1 was 6%; whereas, that of the fluorescent lamp using the spherical phosphor was 1.5%.

Subsequently, as shown in a liquid crystal display of FIG. 4, red-emitting monochrome liquid crystal display devices were manufactured by using the fluorescent lamps mentioned above in combination with a reflecting film 32 and a monochrome TFT liquid crystal panel without a color filter. Under an input powder of 2 W, the brightness of the display surface in the case of the fluorescent lamp using the spherical phosphor was 18% higher than that of the fluorescent lamp using the starting phosphor of Example 1.

(Example 14)

A fluorescent lamp having the same shape as in Example 13 is formed in a same manner as in Example 13 except that a phosphor mixture containing commercially available blue-, green- and red-emitting phosphors for a fluorescent lamp are blended and that the coating weight is set to 5.5 mg/cm². When the obtained fluorescent lamp is turned on under an input power of 2 W, the difference in brightness between both ends of the fluorescent lamp is 9%. A diffuse transmittance of a phosphor layer of the fluorescent lamp is 30%.

Subsequently, each of the commercially available blue-, green- and red-emitting phosphors is supplied into a high frequency plasma with an argon gas as a carrier gas, fused, quenched, and washed with an ultrasonic vibration in water, thereby obtaining three types of spherical phosphors having average particle sizes of 4.6 μm (the content of ultrafine particles having a diameter of 0.2 μm or less: 0.08 wt %), 5.2 μm (the content of ultrafine particles having a diameter of 0.2 μm or less: 0.06 wt %) and 4.3 μm (the content of ultrafine particles having a diameter of 0.2 μm or less: 0.01 wt %), respectively. The similar fluorescent lamp as above is manufactured by using a mixture of these phosphors. Under an input power of 2 W, the difference in brightness between both ends of the fluorescent lamp is 2.5%. The diffuse transmittance of a phosphor layer of the fluorescent lamp is 55%, which is 1.8 times higher than that of the former fluorescent lamp.

A color liquid crystal display is manufactured in the same manner as in Example 13 except that each of two types of fluorescent lamps and a TFT liquid crystal panel having a color filter are used. Each of the liquid crystal displays is driven to show a white color by turning on each fluorescent lamp under an input power of 2 W. The brightness of the display surface of the latter display having the fluorescent lamp using spherical phosphors is 12% higher than that of the former display having the fluorescent lamp using the starting phosphor.

(Example 15)

A starting $CaWO_4$ phosphor having an average particle size of 11.3 μm was prepared by the conventional wet precipitation and firing method. The starting phosphor was supplied into a high frequency plasma with a mixed gas of argon and oxygen as a carrier gas, fused and quenched, thereby obtaining the phosphor of the present invention. The average particle size of the obtained phosphor was 10.5 μm. After an ultrasonic vibration was applied, the resultant phosphor contained ultrafine particles having a diameter of 0.2 μm or less in an amount of 0.05 wt %. To this phosphor, a binder was added, thereby preparing a slurry. The obtained slurry was uniformly coated on a screen base by means of the doctor blade method so as to obtain a phosphor coating weight of 40 mg/cm² after drying, thereby forming a phosphor layer. Thereafter a protection film was adhered thereon to obtain a radiation intensifying screen (Example 15). For comparison, a radiation intensifying screen (Comparative Example 4) was obtained in the same manner as above by using the starting phosphor. The thickness of a phosphor layer of each radiation intensifying screen was measured. As a result, it was 149 μm in Comparative Example 4, whereas, 128 μm in Example 15.

Subsequently, each obtained intensifying screen was allowed to superpose on X-ray film, and an X-ray photograph was taken according to the conventional method. Sensitivity and sharpness of developed X-ray film were evaluated. The sensitivity of Example 15 was 104% based on a value of Comparative Example 4. MTF was measured by the contrast method. The sharpness was compared by using the value of MTF spatial frequency at 2 line pairs/mm. The sharpness of Example 15 was 109% based on the value of Comparative Example 4.

(Example 16)

A starting $Gd_2O_2S:Tb$ phosphor having an average particle size of 4.9 μm was prepared by the conventional firing method with fluxes. The starting phosphor was supplied into a high frequency plasma with argon as a carrier gas, fused and quenched, thereby obtaining the phosphor having an average particle size of 2.4 μm of the present invention. Further, the phosphor of the present invention having an average particle size of 9.5 μm was obtained in the same manner as mentioned above by changing conditions of the plasma and of the powder supplier. Phosphors obtained after applying the ultrasonic vibration and the drying, were further fired in a sulfur atmosphere. The obtained phosphors contained ultrafine particles having a diameter of 0.2 μm or less in an amount of 0.05 wt % and 0.01 wt %, respectively. To each phosphor, a binder was added, thereby preparing two types of phosphor slurries. The obtained two slurries were successively coated on a screen base uniformly by the doctor blade method so as to provide a double-layered phosphor layer having a thickness of 250 $\mu$m after drying. Thereafter a protection film was adhered thereon to obtain a radiation intensifying screen (Example 16 ). For comparison, a radiation intensifying screen (Comparative Example 5) was manufactured in the same manner as above using two phosphors, prepared by the conventional method, having the average particle sizes of 2.5 $\mu$m and 9.8 $\mu$m, respectively. A coating weight of each intensifying screen was measured. It was 78 mg/cm$^2$ in Comparative Example 5 and 96 mg/cm$^2$ in Example 16.

Subsequently, each obtained intensifying screen was allowed to superpose on X-ray film, and an X-ray photograph was taken according to a conventional method. Sensitivity and sharpness of developed X-ray film were evaluated. The sensitivity of Example 16 was 109% based on a value of Comparative Example 5. MTF was measured by a contrast method. The sharpness was measured by using the value of MTF spatial frequency at 2 line pairs/mm. The sharpness of Example 16 was 101% based on the value of Comparative Example 5.

(Example 17)

A starting $Gd_2O_2S$:Tb phosphor having an average diameter of 8.1 $\mu$m was prepared by the conventional firing method with fluxes. The starting phosphor was supplied into a high frequency plasma with argon as a carrier gas, fused and quenched. The resultant phosphor was further fired at 700° C. in a sulfur atmosphere, thereby obtaining the phosphor having an average particle size of 7.6 $\mu$m. After applying the ultrasonic vibration, the resultant phosphor contained ultrafine particle having a diameter of 0.2 $\mu$m or less in an amount of 1 wt %. The phosphor was coated on a protection film by the settling method so as to obtain a coating weight of 80 mg/cm$^2$ after drying. Thereafter, a screen base was adhered thereon to obtain a radiation intensifying screen. A test piece of 1 cm$^2$ in size was cut from the radiation intensifying screen, and the cross section was observed with SEM. It was found that the obtained intensifying screen consisted of a layer containing ultrafine particles alone on the side of the screen base and a layer containing both ultrafine particles and spherical particles on the former layer.

Subsequently, the obtained intensifying screen was allowed to superpose on X-ray film, and an X-ray photograph was taken according to a conventional method. Sensitivity and sharpness of the developed X-ray film were evaluated. The sensitivity of Example 17 was 112% based on a value of Comparative Example 5. MTF was measured by the contrast method. The sharpness was compared by using the value of MTF spatial frequency at 2 line pairs/mm. The sharpness of Example 17 was 118% based on the value of Comparative Example 5.

(Example 18)

As a raw material, use was made of $Gd_2O_2S$:Pr having an average particle size of 5.2 $\mu$m prepared by the flux method. The molar ratio of Pr/Gd was 0.06%. To the starting phosphor, a 1/100 diluted aqueous Tamol solution was added, followed by vacuum filtration. After water was replaced with alcohol, the resultant phosphor was dried. The obtained sample was introduced into a 4 MHz high frequency plasma torch under an argon atmosphere and quenched. The resultant phosphor contained ultrafine particles in an amount of 1%. To the sample, an ultrasonic vibration was applied in water and allowed to stand still. After removing the supernatant, spherical particles containing ultrafine particles in an amount of 0.1% were obtained. The body color of the phosphor exhibited human-skin color. The reflectance for visible light was 32%. Further, the phosphor was fired for one hour at 900° C. in a sulfur atmosphere in the same manner as in Example 11, thereby obtaining the phosphor of the present invention. On the surface of the phosphor, approximately 0.1% of the ultrafine particles were remained in a fused form. The phosphor consists of white spherical particles having an average particle size of 6.1 $\mu$m. The reflectance for visible light of the phosphor was 93%. When the X-ray diffraction of the phosphor was measured, it exhibited a diffraction pattern of an oxysulfide. The molar ratio of Pr/Gd was 0.05%. The emission color by electron excitation was green which was consistent with that of the starting phosphor.

(Example 19)

As a raw material, use was made of $Y_2O_2S$:Tb having an average particle size of 4.3 $\mu$m prepared by the flux method. The molar ratio of Tb/Y was 6.5%. To the starting phosphor, a 1/100 diluted aqueous Tamol solution was added, followed by vacuum filtration. After water was replaced with alcohol, the resultant phosphor was dried. To the obtained sample, sulfur was added in an amount of 3 wt %, and then the sample was introduced into a 4 MHz high frequency plasma torch under an argon atmosphere, quenched and recovered by a cyclone. To the resultant sample, an ultrasonic vibration was applied in water and allowed to stand still. After removing the supernatant, spherical particles were obtained. The obtained phosphor contained ultrafine particles in an amount of 0.05%. The body color of the phosphor exhibited human-skin color. The reflectance for visible light was 50%. Further, the spherical particles were fired for one hour at 900° C. in a sulfur atmosphere in the same manner as in Example 11, thereby obtaining the phosphor of the present invention. The phosphor consists of white spherical particles having an average particle size of 5.5 $\mu$m containing detectable ultrafine particles in an amount of 0.02%. The reflectance for visible light of the phosphor was 91% and the molar ratio of Tb/Y was 3.5%. In the emission spectrum by electron excitation, the intensity of the 544 nm band was 10 times stronger than that of the 415 nm band, and the emission color was green suitable for a phosphor for use in a projection cathode-ray tube.

(Comparative Example 6)

$CaWO_4$ phosphor (Comparative Example 6) was prepared by a conventional wet precipitation and firing method. The average particle size of the obtained phosphor was 4.3 $\mu$m as measured by the Blaine method. The peak wavelength of the phosphor in the emission spectrum was 411 nm as excited by ultraviolet radiation or electron beams. Chromaticity values are as follows: x=0.165 and y=0.120.

(Example 20)

Figure 11:
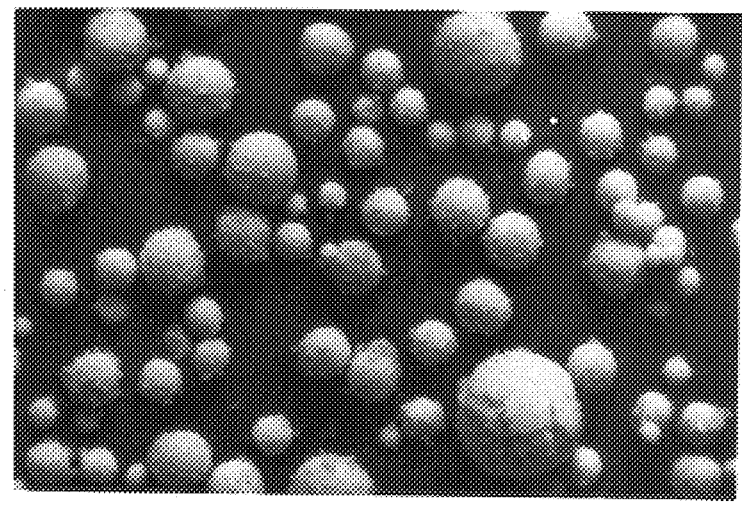
FIG. 11 is an electron microphotograph showing a particle structure of a calcium tungstate phosphor of Example 20 of the present invention.

A starting $CaWO_4$ phosphor of Comparative Example 6 was supplied into a high frequency plasma with a mixed gas of argon and oxygen as a carrier gas, fused and quenched, thereby obtaining a phosphor (Example 20). The average particle size of the phosphor was 3.9 $\mu$m as measured by the Blaine method. A microphotograph of the obtained phosphor is shown in FIG. 11. The ratio of the major diameter to the minor diameter with respect to individual phosphor particles fell within the range of 1.00 to 1.08 as measured from the electron microphotograph. Phosphor particles of 0.2 $\mu$m or less generated by partial evaporation of the phosphor were deposited on the surface of the spherical particles. After applying the ultrasonic vibration and removing the supernatant, the resultant phosphor contained ultrafine particles of 0.2 μm or less in an amount of 0.1 wt %. It was found that the X-ray diffraction pattern of this phosphor was consistent with that of $CaWO_4$.

The emission spectrum of the phosphor was determined by ultraviolet or electron beam excitation. As a result, the peak wavelength was 433 nm, which was shifted by 20 nm or more toward the longer wavelength side compared to the spectrum of the phosphor of Comparative Example 6. Hence, the chromaticity thereof was x=0.173 and y=1.44. The powder brightness was 78% based on the value of the phosphor of Comparative Example 6, as measured by exciting with ultraviolet ray of 254 nm. Also, the powder brightness of the phosphor was measured by electron beam excitation under a current density of 0.5 μA/cm² and an accelerating voltage of 10 kV. As a result, it exhibited approximately 102% based on that of the phosphor of Comparative Example 6.

Subsequently, the obtained phosphor was coated on a glass substrate by the settling method, thereby forming a phosphor layer having a coating weight of 10 mg/cm². The transmittance of the phosphor layer was 1.7 times higher than that formed of the phosphor Comparative Example 6.

Further, a phosphor screen having a coating weight of 6 mg/cm² was formed on the inner surface of a glass bulb using the obtained phosphor by the settling method. An aluminum backing was provided and an electron gun was installed, followed by evacuation and sealing, thereby obtaining a 7 inch cathode-ray tube. The brightness of the cathode-ray tube was measured under an accelerating voltage of 30 kV and a beam current of 500 μA. This value was 118% based on a value of a cathode-ray tube formed in the same manner as above using the phosphor of Comparative Example 6.

(Comparative Example 7)

$CaWO_4$:Pb phosphor (Comparative Example 7) was prepared by the conventional wet precipitation and firing method. The average particle size of the phosphor was 3.6 μm as measured by the Blaine method. The peak wavelength in the emission spectrum of the phosphor was 435 nm as determined by ultraviolet radiation or electron beam excitation. Chromaticity values were as follows: x=0.172 and y=1.169. The peak wavelength in the excitation spectrum positioned at 270 nm.

(Example 21)

A starting $CaWO_4$:Pb phosphor of Comparative Example 7 was supplied into a high frequency plasma with a mixed gas of argon and oxygen as a carrier gas, fused and quenched, thereby obtaining a phosphor (Example 21). The average particle size of the phosphor was 3.1 μm as measured by the Blaine method. The ratio of the major diameter to the minor diameter with respect to individual phosphor particles fell within the range of 1.00 to 1.11 as measured from an electron microphotograph. After applying the ultrasonic vibration and removal of the supernatant, the resultant phosphor contained ultrafine particles of 0.2 μm or less in an amount of 0.05 wt %. It was found that the X-ray diffraction pattern of this phosphor was consistent with that of $CaWO_4$.

The emission spectrum of the phosphor was determined by ultraviolet excitation or electron beam excitation. As a result, the peak wavelength was 458 nm. Chromaticity values thereof were as follows: x=0.180 and y=1.86. The main peak of the excitation spectrum laid at 259 nm, of which deviation from 254 nm was little. The powder brightness was 105% based on the value of the phosphor of Comparative Example 7, as measured by exciting with an ultraviolet ray of 254 nm. Also, the powder brightness of the phosphor was measured by electron beam excitation under a current density of 0.5 μA/cm² and an accelerating voltage of 10 kV. As a result, it exhibited approximately 103% based on that of the phosphor of Comparative Example 7.

Subsequently, the phosphor was coated on a glass substrate by the settling method, thereby forming a phosphor layer having a coating weight of 9 mg/cm². The transmittance of the phosphor layer was 1.8 times higher than that formed of the phosphor of Comparative Example 7.

Further, a phosphor screen having a coating weight of 6 mg/cm² was formed on the inner surface of a glass bulb using the obtained phosphor by the settling method. An aluminum backing was provided and an electron gun was installed, followed by evacuation and sealing, thereby obtaining a 7 inch cathode-ray tube. The brightness of the cathode-ray tube was measured under an accelerating voltage of 30 kV and a beam current of 500 μA. The value was 121% based on a value of a cathode-ray tube formed in the same manner as above using the phosphor of Comparative Example 7.

(Comparative Example 8)

A $MgWO_4$:Pb phosphor (Comparative Example 8) was prepared by the conventional firing method. The average particle size of the phosphor was 4.2 μm as measured by the Blaine method. A peak wavelength of the phosphor in the emission spectrum was 498 nm as measured by ultraviolet radiation or electron beam excitation. Chromaticity values were as follows: x=0.225 and y=0.418.

(Example 22)

A starting $MgWO_4$ phosphor of Comparative Example 8 was supplied into a high frequency plasma with a mixed gas of argon and oxygen as a carrier gas, fused and quenched, thereby obtaining a phosphor (Example 22). The average particle size of the phosphor was 4.0 μm as measured by the Blaine method. The ratio of the major diameter to the minor diameter with respect to individual phosphor particles fell within the range of 1.00 to 1.07 as measured from an electron microphotograph. After the ultrasonic vibration was applied and the supernatant was removed, the resultant phosphor contained ultrafine particles of 0.2 μm or less in an amount of 0.2 wt %. It was found that the X-ray diffraction pattern of this phosphor was consistent with that of $MgWO_4$.

The emission spectrum of the phosphor was determined by ultraviolet or electron beam excitation. As a result, the peak wavelength was 512 nm. Chromaticity values thereof were as follows: x=0.233 and y=0.441. The excitation spectrum was shifted toward the shorter wavelength side of 254 nm. The powder brightness was 114% based on the value of the phosphor of Comparative Example 8, as measured by exciting with ultraviolet ray of 254 nm. Also, the powder brightness of the phosphor was measured by electron beam excitation under a current density of 0.5 μA/cm² and an accelerating voltage of 10 kV. As a result, it exhibited approximately 109% based on that of the phosphor of Comparative Example 8. As mentioned above, as a result of shifting the excitation spectrum toward the shorter wavelength side, absorption of ultraviolet radiation increased, resulting in high luminous efficiency.

Subsequently, the phosphor was coated on a glass substrate by the settling method, thereby forming a phosphor layer having a coating weight of 12 mg/cm$^2$. The transmittance of the phosphor layer was 1.5 times higher than that formed of the phosphor Comparative Example 8.

Further, a phosphor screen having a coating weight of 6 mg/cm$^2$ was formed on the inner surface of a glass bulb using the obtained phosphor by the settling method. An aluminum backing was provided and an electron gun was installed, followed by evacuation and sealing, thereby obtaining a 7 inch cathode-ray tube. The brightness of the cathode-ray tube was measured under an accelerating voltage of 30 kV and a beam current of 500 μA. The value was 115% based on a value of a cathode-ray tube formed in the same manner as above using the phosphor of Comparative Example 8.

(Example 23)

A CaWO$_4$ phosphor having an average particle size of 5.1 μm was prepared by the conventional firing method. The starting phosphor was supplied into a high frequency plasma with a mixed gas of argon and oxygen as a carrier gas, fused and quenched, thereby obtaining the phosphor having an average particle size of 2.5 μm of the present invention. Further, the phosphor of the present invention having an average particle size of 9.6 μm was obtained in the same manner as mentioned above by changing conditions in the plasma and the powder supplier. After applying the ultrasonic vibration, these phosphors contained ultrafine particles having a diameter of 0.2 μm or less in an amount of 0.05 wt % and 0.01 wt %, respectively. To each phosphor, a binder was added, thereby preparing two types of phosphor slurries. The obtained two slurries were successively coated on a screen base uniformly by the doctor blade method so as to provide a double-layered phosphor layer having a thickness of 250 μm after drying. Thereafter a protection film was adhered thereon to obtain a radiation intensifying screen. For comparison, a radiation intensifying screen (Comparative Example 9) was manufactured in the same manner as above using two phosphors, prepared by the conventional method, having average particle sizes of 2.7 μm and 9.9 μm, respectively. The coating weight of each intensifying screen was measured. It was 77 mg/cm$^2$ in Comparative Example 9 and 94 mg/cm$^2$ in Example 23.

Subsequently, each obtained intensifying screen was allowed to superpose on X-ray film, and an X-ray photograph was taken according to a conventional method. Sensitivity and sharpness of developed X-ray film were evaluated. The sensitivity of Example 23 was 108% based on a value of Comparative Example 9. MTF was measured by a contrast method. The sharpness was compared by using the value of MTF spatial frequency at 2 line pairs/mm. The sharpness of Example 23 was 101% based on the value of Comparative Example 4.

(Example 24)

A CaWO$_4$ phosphor having an average particle size of 8.3 μm was prepared by the conventional wet precipitation and firing method. The starting phosphor was supplied into a high frequency plasma with a mixed gas of argon and oxygen as a carrier gas, fused and quenched, thereby obtaining the phosphor of the present invention. An average particle size of the obtained phosphor was 7.8 μm. After the ultrasonic vibration was applied and the supernatant was removed, the resultant phosphor contained ultrafine particles of 0.2 μm or less in an amount of 1 wt %. The phosphor was coated on a protection film by the settling method so as to obtain a coating weight of 50 mg/cm$^2$ after drying. Thereafter, a screen base was adhered thereon to obtain a radiation intensifying screen. A test piece of 1 cm$^2$ in size was cut from the radiation intensifying screen and the cross section was observed with SEM. As a result, it was found that the obtained intensifying screen consisted of a layer containing ultrafine particles alone on the side of the screen base and a layer containing both ultrafine particles and spherical particles on the former layer.

Subsequently, the obtained intensifying screen was allowed to superpose on X-ray film, an X-ray photograph was taken according to a conventional method. Sensitivity and sharpness of developed X-ray film were evaluated. The sensitivity of Example 24 was 135% based on a value of Comparative Example 4. MTF was measured by the contrast method. The sharpness was compared by using the value of MTF spatial frequency at 2 line pairs/mm. The sharpness of Example 24 was 111% based on the value of Comparative Example 4.

What is claimed is:

1. A radiation intensifying screen, comprising a screen base, a phosphor layer formed on said screen base, a protection film formed on said phosphor layer, wherein at least a part of the phosphor constituting said phosphor layer comprises transparent spherical particles having an average particle size of 0.5 to 20 μm and a ratio of the major diameter to the minor diameter of individual particles in the range of 1.0 to 1.5, and ultrafine particles having a diameter of 0.2 μm or less in an amount of 0.001–5 wt %.

2. The radiation intensifying screen according to claim 1, wherein the content of said ultrafine particles of 0.2 μm or less in diameter is 0.01 to 2 wt %.

* * * * *

UNITED STATES PATENT AND TRADEMARK OFFICE
CERTIFICATE OF CORRECTION

PATENT NO. : 5,814,932
DATED : September 29, 1998
INVENTOR(S) : Naotoshi MATSUDA et al.

It is certified that error appears in the above-indentified patent and that said Letters Patent is hereby corrected as shown below:

Title Page, Item [57], in the Abstract, line 7, after "0.2 $\mu$m", insert --or--.

Signed and Sealed this

Fourteenth Day of September, 1999

Attest:

Q. TODD DICKINSON

*Attesting Officer*     *Acting Commissioner of Patents and Trademarks*